US008855068B2

(12) United States Patent
Qin et al.

(10) Patent No.: US 8,855,068 B2
(45) Date of Patent: Oct. 7, 2014

(54) METHOD AND SYSTEM FOR COORDINATED TRANSMISSION AND A MOBILE TERMINAL AND NETWORK SIDE DEVICE

(75) Inventors: Fei Qin, Beijing (CN); Jinbo Zhao, Beijing (CN); Shaohui Sun, Beijing (CN); Li Liu, Beijing (CN); Qiubin Gao, Beijing (CN); Rakesh Tamrakar, Beijing (CN); Chun Luo, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 602 days.

(21) Appl. No.: 13/144,633

(22) PCT Filed: Jan. 13, 2010

(86) PCT No.: PCT/CN2010/000062
§ 371 (c)(1),
(2), (4) Date: Aug. 18, 2011

(87) PCT Pub. No.: WO2010/081388
PCT Pub. Date: Jul. 22, 2010

(65) Prior Publication Data
US 2011/0310786 A1 Dec. 22, 2011

(30) Foreign Application Priority Data

Jan. 14, 2009 (CN) .......................... 2009 1 0076372
Jan. 23, 2009 (CN) .......................... 2009 1 0076883
Jan. 23, 2009 (CN) .......................... 2009 1 0076884

(51) Int. Cl.
| | |
|---|---|
| H04W 4/00 | (2009.01) |
| H04B 17/00 | (2006.01) |
| H04L 5/00 | (2006.01) |
| H04W 72/12 | (2009.01) |
| H04B 7/02 | (2006.01) |
| H04W 72/04 | (2009.01) |
| H04W 24/10 | (2009.01) |
| H04L 25/02 | (2006.01) |

(52) U.S. Cl.
CPC .......... *H04W 24/10* (2013.01); *H04B 17/0042* (2013.01); *H04L 5/0032* (2013.01); *H04W 72/1263* (2013.01); *H04W 72/1242* (2013.01); *H04B 7/024* (2013.01); *H04W 72/1215* (2013.01); *H04B 17/0077* (2013.01); *H04L 25/0202* (2013.01); *H04L 5/0007* (2013.01); *H04L 5/0035* (2013.01); *H04W 72/0426* (2013.01)
USPC .......................................... 370/329; 370/338

(58) Field of Classification Search
None
See application file for complete search history.

(56) References Cited

U.S. PATENT DOCUMENTS

2010/0130219 A1* 5/2010 Cave et al. ..................... 455/450
2010/0177746 A1* 7/2010 Gorokhov et al. ............ 370/336

FOREIGN PATENT DOCUMENTS

CN 101272592 A 9/2008
CN 101304304 A 11/2008
(Continued)

OTHER PUBLICATIONS

Stefan Brueck, Lu Zhao, Jochen Giese and M. Awais Amin, Centralized Scheduling for Joint Transmission Coordinated Multi-Point in LTE-Advanced, 2010, pp. 177-184.*

(Continued)

*Primary Examiner* — John Blanton
*Assistant Examiner* — Christopher Crutchfield
(74) *Attorney, Agent, or Firm* — Barnes & Thornburg LLP

(57) ABSTRACT

A method and a system for coordinated transmission, and a mobile terminal and network side device are provided. The method for coordinated transmission includes: reporting by the terminal of a signal measurement result; determining the coordinated transmission state of the terminal according to the signal measurement result; and providing transmission service for the terminal according to the determined transmission state.

21 Claims, 10 Drawing Sheets

(56) References Cited

FOREIGN PATENT DOCUMENTS

| EP | 1740008 A1 | 1/2007 |
|---|---|---|
| WO | 2007/149349 A2 | 12/2007 |

OTHER PUBLICATIONS

Author Unknown, LTE-Advanced—Coordinated Multipoint transmission/reception, Doc. No. R1-082469, Jul. 4, 2008, pp. 1-6.*
Author Unknown, Views on Coordinated Multipoint Transmission/Reception in LTE-Advanced, Doc. No. R1-084252, Nov. 14, 2008, pp. 1-13.*
ETRI; Coordinated multi-cell transmission for LTE-Advanced downlink; 3GPP TSG RAN WG1 Meeting #54; R1-082896; Aug. 22, 2008; pp. 1-2.
Search Report for International Patent Application No. PCT/CN2010/000062; Apr. 22, 2010.
Motorla, "Coordinated Multi-Point Transmission-Exploring Possible System Operations and UE Support," Nov. 10-14, 2008, pp. 1-4.
3rd Generation Partnership Project; Technical Specification Group Radio Access Network; Further Advancements for E-UTRA Physical Layer Aspects (Release X), 3GPP TR 36.814, vol. 1.1, Sep. 2008, pp. 1-16.

* cited by examiner

METHOD AND SYSTEM FOR COORDINATED TRANSMISSION AND A MOBILE TERMINAL AND NETWORK SIDE DEVICE

PRIORITY CLAIM

This application is a U.S. National Phase of International Patent Application No. PCT/CN2010/000062, filed Jan. 13, 2010, which claims priority to Chinese Patent Application No. 200910076883.3, filed on Jan. 23, 2009, titled "METHOD AND DEVICE FOR COORDINATED TRANSMISSION"; Chinese Patent Application No. 200910076884.8, filed on Jan. 23, 2009, titled "SIGNAL TRANSMISSION METHOD AND SIGNAL TRANSCEIVING CONTROL APPARATUS"; and Chinese Patent Application No. 200910076372.1, filed on Jan. 14, 2009, titled "METHOD, SYSTEM AND APPARATUS FOR DETERMINING TIME-FREQUENCY RESOURCES", the disclosures of which are incorporated herein by reference in their entirety.

FIELD

Disclosed embodiments relate to the field of radio communications, and in particular, to a method and a system for coordinated transmission, a user equipment and a network side device.

Disclosed embodiments also relate to radio communication technologies, and in particular, to a method, a system and an apparatus for determining time-frequency resources.

Disclosed embodiments further relate to the field of mobile communications, and in particular, to a signal transmission method and a signal transceiving control apparatus.

BACKGROUND

Orthogonal Frequency Division Multiplex (OFDM) technology is employed in a Long Term Evolution (LTE) system, users are distinguished via orthogonal subcarriers, and a service cell sets multiple transmission modes, for example, whether beamforming is employed, whether Multiple Input Multiple Output (MIMO) is employed, and whether monouser MIMO or multi-user MIMO is employed, for a UE via Radio Resource Control (RRC) signaling according to different physical-layer key technologies used and the system load, etc.

In an LTE system, a service cell independently schedules a UE, and the common process is as follows.

A UE reports information such as its location and interference environment to feed back to a network end via a measurement on a signal, where the information includes pilot signal strength of the anchor cell and the neighboring cells, a Channel Quality Indicator (CQI, i.e., a size parameter of a transmission block corresponding to the signal-to-noise ratio of a reference signal of the anchor cell that is measured, which appears in the form of an index) and Precoding Matrix Index (PMI, which is channel state information); the network side makes a scheduling decision in conjunction with the measurement information and in consideration of the Quality of Service (QoS) of a user and such criterions as cell throughput maximization, etc., and finally indicates the user to employ which time-frequency resources for transmitting data via scheduling signaling.

As different from a Code Division Multiple Access (CDMA) system, in an LTE system, there substantially exists no inter-user interference in a cell, and inter-cell interference becomes the main factor that influence the system capacity. Especially for edge users of a cell, a strong interference is laid by neighboring cells, the spectrum efficiency is low, and the performance is poor. In order to improve the performance of edge users, in an LTE system, an Inter-Cell Interference Coordinate (ICIC) technology is employed, and the inter-cell interference is reduced via static partial frequency multiplex or semi-static interference coordinate. However, for such a static and semi-static ICIC technology, the interference coordinate capability is limited; moreover, the scheduling gain of the system may be influenced, and the problem of spectrum efficiency of edge users cannot be well addressed.

In order to further improve the system performance and the edge user rate, in an LTE-Advanced system, a Coordinated multi-point transmission/reception (CoMP) technology is proposed. FIG. 1 is a schematic diagram of a multi-cell coordinated transmission solution under CoMP technology. As shown in the figure, during multi-cell coordinated transmission, a plurality of coordinated cells may simultaneously transmit data for one user (for example, CELL 1, CELL 2 and CELL 3 simultaneously transmit data for UE1, and CELL 2 and CELL 3 simultaneously transmit data for UE2), or they may transmit data for a user independently (for example, CELL 3 independently transmits data for UE3); the users may process the data of a plurality of cells in coordination, or they may independently process the data of each cell, so that the quality of a received signal may be effectively improved, or the interference may be effectively eliminated.

A plurality of cells simultaneously transmit a signal for the same user on the same time-frequency resource, and the user simultaneously receives the signals from a plurality of cells; and by employing a joint signal processing technology, the user may effectively improve the quality of valid signals and eliminate the inter-cell interference.

A UE reports information such as its location and interference environment to feed back to the network side via a measurement on a signal, hereby the network side makes a scheduling decision, and it needs to transfer the scheduling information (for example, the time-frequency resource allocated to a user) to a User Equipment (UE) in time.

In CoMP technology, it needs to schedule some UEs via multi-cell coordination; moreover, the UEs can detect signals from multiple cells in coordination. Therefore, it needs to make the corresponding network entities (including UEs, service cells and neighboring cells that take part in the coordinated transmission) know the related information of coordinated scheduling, including whether it is coordinated transmission mode or independent transmission mode, with which cells the anchor cell performs coordinated transmission, the port information of the cells that take part in coordinated transmission and information of the time-frequency resources scheduled; the defects of the prior art lie in that, the transmission modes between the LTE network and the UEs are independent, and it can only transfer the scheduling information of the anchor cell to the UE via a control channel or RRC signaling, while no timely scheduling information interaction is needed between cells, thus the requirements of CoMP cannot be met.

OFDM technology is employed in an LTE system, UEs are distinguished via orthogonal subcarriers, and substantially no inter-UE interference exists in a cell, but inter-cell interference becomes the main factor of interference, and especially for edge UEs of a cell, a strong interference is laid by neighboring cells, so that the spectrum efficiency and the performance of the UE are poor.

In order to improve system performance and edge UE performance, ICIC technology is employed in an LTE system. In this technology, inter-cell interference is reduced via static partial frequency multiplex or semi-static interference coordinate. However, for such a static and semi-static ICIC technology, the interference coordinate capability is limited; moreover, the scheduling gain of the system will be influenced, and the problem of spectrum efficiency of edge users cannot be well addressed.

In order to further improve the system performance and the edge UE performance, in an LTE-Advanced system, CoMP technology is proposed, and a distributed and independent scheduling method is proposed.

However, in such a distributed and independent scheduling method, it only provides a solution that each cell independently schedules the time-frequency resources of a UE, without providing a solution that how a plurality of cells schedule the time-frequency resources of a UE.

In conclusion, the present distributed and independent scheduling method does not provide a solution that how a plurality of cells schedule the time-frequency resources of a UE.

In a cellular mobile communication system, the interference that influences the quality of a user communication signal is derived from the communication signals of other users in the same cell and the user communication signals in neighboring cells; in an LTE system, OFDM technology is employed, different users in a cell are distinguished via orthogonal subcarriers, and the mutual interferences between different users in the same cell are reduced considerably. Therefore, in the LTE system, the interference caused by signals from neighboring cells becomes the main factor that influences the system communication quality; and especially for users located on the cell edge, because the interference caused by signals from neighboring cells is strong, the communication quality is poor.

In order to improve the communication quality of edge users of a cell, in an LTE system, inter-cell signal interference is reduced via static partial frequency multiplex or semi-static interference coordinate by employing ICIC technology. However, the anti-interference capability obtained by employing such a method is limited; moreover, the scheduling gain of the system is influenced, and the problem of poor communication quality of cell edge users cannot be well addressed.

SUMMARY

Disclosed embodiments provide a method and a device for coordinated transmission, thereby addressing the problem in the prior art that CoMP requirements cannot be met due to the independent transmission mode between an LTE network and a UE.

One disclosed embodiment provides a method for coordinated transmission, including:
reporting, by a UE, a signal measurement result;
determining a coordinated transmission mode of the UE according to the signal measurement result; and
providing a transmission service for the UE according to the determined mode.

Another disclosed embodiment provides a user equipment, including:
a measuring module, configured to measure signals of a anchor cell and neighboring cells with the same frequency; and
a reporting module, configured to report a signal measurement result used for a coordinated transmission service.

A further disclosed embodiment provides a network side device, including:
a receiving module, configured to receive a signal measurement result reported; a transmission mode determination module, configured to determine a coordinated transmission mode of a UE according to the signal measurement result; and a business service module, configured to provide a transmission service for the UE according to the determined mode.

Yet another disclosed embodiment provides a system for coordinated transmission, including:
a UE, configured to report a signal measurement result; and
a network side device, configured to determine a coordinated transmission mode of the UE according to the signal measurement result and provide a transmission service for the UE according to the determined mode.

Disclosed embodiments have the following beneficial effects.

In one disclosed embodiment, by measuring and reporting a signal via a UE, the network side may judge whether the UE needs coordinated transmission according to the result reported, and indicate the UE to perform the necessary transmission mode switching via upper-layer signaling, and inform the UE of a possible set of coordinated transmission cells; moreover, it may transmit data for the user according to the result finally scheduled. Therefore, signals from multiple cells can be detected in coordination when some UEs are scheduled via multi-cell coordination by using CoMP technology, and the corresponding network entities can be made to know the related information of coordinated scheduling, thereby overcoming the defect that CoMP requirements cannot be met due to the independent transmission mode between the existing LTE network and UE. Compared with the prior art, in the solutions of the embodiments of the invention, multi-cell coordinated transmission may be effectively accomplished, and the throughput of edge users may be improved.

Another disclosed embodiment provides a method, a system and an apparatus for determining time-frequency resources, thereby time-frequency resources can be coordinately scheduled among a plurality of cells.

A further disclosed embodiment provides a method for determining time-frequency resources, including:
determining, by a first scheduling device, a coordinately scheduled UE that belongs to a anchor cell corresponding to the first scheduling device, wherein the coordinately scheduled UE is a UE that can receive signals from the anchor cell and another coordinated cell;
determining, by the first scheduling device, the coordinated cell corresponding to the coordinately scheduled UE;
sending, by the first scheduling device, information of time-frequency resources preallocated to the coordinately scheduled UE to a second scheduling device corresponding to the coordinated cell, and indicating the second scheduling device to determine whether to perform coordinated scheduling on the coordinately scheduled UE according to the information of the time-frequency resources; and
determining, by the first scheduling device, time-frequency resources allocated to the coordinately scheduled UE, according to the result whether the second scheduling device performs coordinated scheduling on the coordinately scheduled UE.

Yet another disclosed embodiment provides a system for determining time-frequency resources, including:
a first scheduling device, configured to determine a coordinately scheduled UE that belongs to a anchor cell corresponding to the first scheduling device, determine a coordinated cell corresponding to the coordinately scheduled UE, send information of time-frequency resources preallocated to the coordinately scheduled UE, and determine time-frequency resources allocated to the coordinately scheduled UE according to the result whether the second scheduling device corresponding to the coordinated cell performs coordinated scheduling on the coordinately scheduled UE, wherein the coordinately scheduled UE is a UE that can receive signals from the anchor cell and another coordinated cell; and the second scheduling device corresponding to the coordinated cell, configured to determine whether to perform coordinated scheduling on the coordinately scheduled UE according to the received information of the time-frequency resources.

Another disclosed embodiment provides a scheduling device, including:

a UE determination module, configured to determine a coordinately scheduled UE that belongs to a anchor cell corresponding to the scheduling device, wherein the coordinately scheduled UE is a UE that can receive signals from the anchor cell and another coordinated cell; a cell determination module, configured to determine the coordinated cell corresponding to the coordinately scheduled UE; an information sending module, configured to send information of time-frequency resources preallocated to the coordinately scheduled UE; and a first scheduling processing module, configured to determine time-frequency resources allocated to the coordinately scheduled UE according to a result whether a scheduling device corresponding to the coordinated cell performs coordinated scheduling on the coordinately scheduled UE.

One disclosed embodiment provides another scheduling device, including:

an information receiving module, configured to receive the information of the time-frequency resources; and a determining module, configured to determine whether to perform coordinated scheduling on a coordinately scheduled UE according to the received information of the time-frequency resources.

In another disclosed embodiment, the first scheduling device determines a coordinately scheduled UE that belongs to a anchor cell corresponding to the first scheduling device, wherein the coordinately scheduled UE is a UE that can receive signals from the anchor cell and another coordinated cell; the first scheduling device determines the coordinated cell corresponding to the coordinately scheduled UE; the first scheduling device sends information of time-frequency resources preallocated to the coordinately scheduled UE to a second scheduling device corresponding to the coordinated cell, and indicate the second scheduling device to determine whether to perform coordinated scheduling on the coordinately scheduled UE according to the information of the time-frequency resources; and the first scheduling device determines time-frequency resources allocated to the coordinately scheduled UE, according to the result whether the second scheduling device performs coordinated scheduling on the coordinately scheduled UE. Because time-frequency resources can be scheduled after negotiating among a plurality of cells, the spectrum efficiency of the cell and the rate of the cell edge UEs can be improved.

A further disclosed embodiment provides a signal transmission method and a signal transceiving control apparatus, thereby addressing the problem in the prior art that the communication quality of the cell edge users is bad.

The technical solutions of the disclosed embodiments are as follows.

A signal transmission method, including:

determining, by a first signal transceiving control apparatus, at least one second signal transceiving control apparatus that performs coordinated transmission on a UE together with the first signal transceiving control apparatus, when the first signal transceiving control apparatus that has established a communication connection with the UE determines that coordinated transmission needs to be performed on the UE;

notifying the determined second signal transceiving control apparatus of an identifier of the UE and information of time-frequency resources for sending a signal to the UE;

sending, by the first signal transceiving control apparatus, a signal to the UE on the corresponding time-frequency resources according to the information of the time-frequency resources; and sending, by the second signal transceiving control apparatus, a signal to the UE corresponding to the UE identifier based on the corresponding time-frequency resources according to the information of the time-frequency resources and the identifier of the UE that are sent from the first signal transceiving control apparatus.

A signal transceiving control apparatus, including:

a judging unit, configured to judge whether coordinated transmission needs to be performed on a UE; a determining unit, configured to determine at least one signal transceiving control apparatus that performs coordinated transmission on the UE together with the signal transceiving control apparatus in which the determining unit lies when the judgment result of the judging unit is that coordinated transmission needs to be performed on the UE; a first notifying unit, configured to notify the signal transceiving control apparatus determined by the determining unit of an identifier of the UE and information of time-frequency resources for sending a signal to the UE; a first signal sending unit, configured to send a signal to the UE on the corresponding time-frequency resources according to the information of the time-frequency resources indicated by the first notifying unit; and a second signal sending unit, configured to send a signal to a UE corresponding to a UE identifier based on corresponding time-frequency resources according to information of the time-frequency resources and an identifier of the UE sent from another signal transceiving control apparatus.

In the disclosed embodiments, a signal transceiving control apparatus with coordinated transmission capability determines a UE on which coordinated transmission needs to be performed, and it further determines information of another signal transceiving control apparatus that takes part in the coordinated transmission corresponding to the UE on which coordinated transmission needs to be performed, and then it transmits data to the UE on which coordinated transmission needs to be performed jointly with another signal transceiving control apparatus that takes part in the coordinated transmission, so that a plurality of signal transceiving control apparatuses can transmit signals to a UE coordinately, and a feasible solution can be provided to improve the communication quality of a user, especially a cell edge user.

DETAILED DESCRIPTION

The specific embodiments of the invention will now be illustrated in conjunction with the drawings.

First, the implementation of a method and a device for coordinated transmission will be illustrated, which can address the problem in the prior art that CoMP requirements cannot be met due to the independent transmission mode between an LTE network and a UE.

Figure 1:
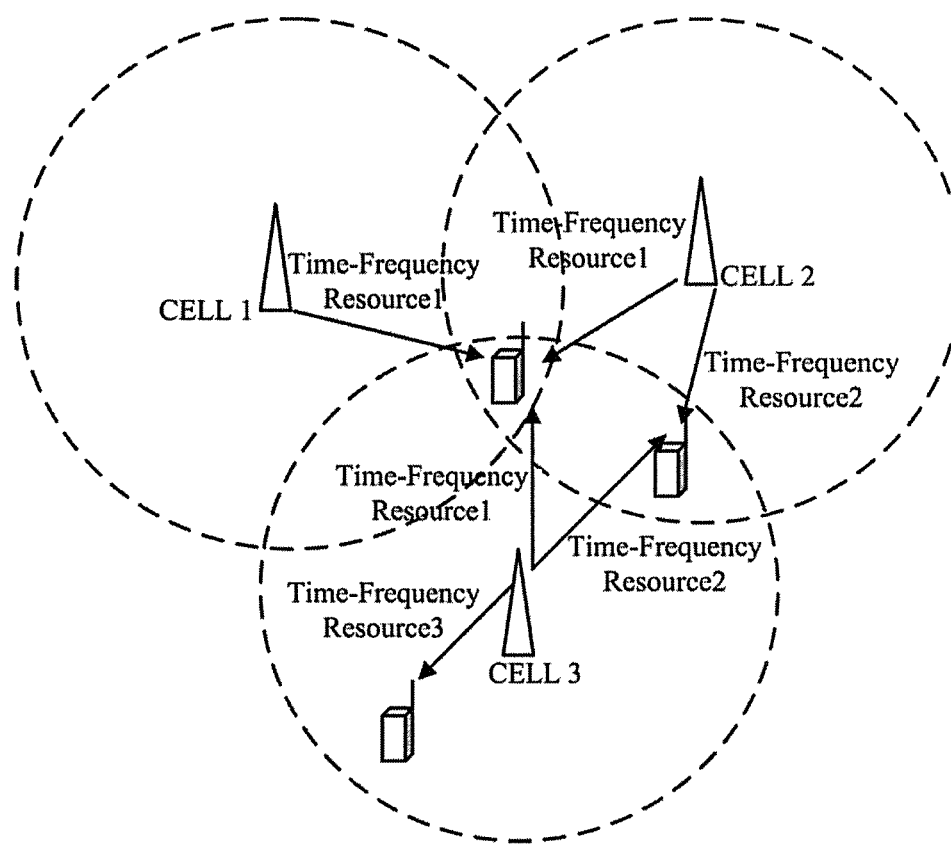
FIG. 1 is a schematic diagram of a multi-cell coordinated transmission solution under CoMP technology in the prior art.
Figure 2:
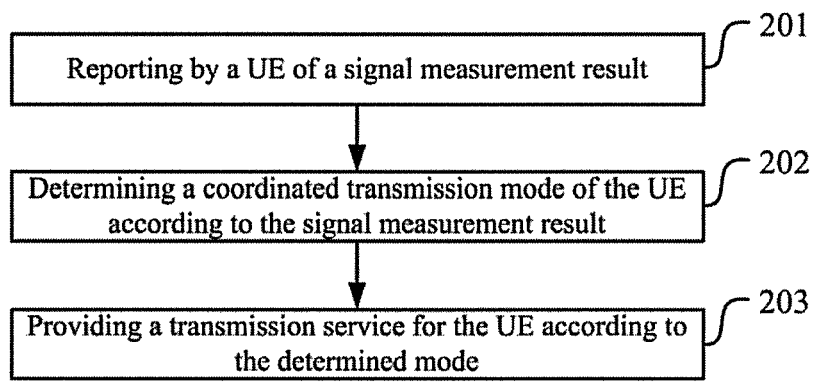
FIG. 2 is a schematic flow chart of a method for coordinated transmission in one embodiment of the invention.

FIG. 2 is a schematic flow chart of a method for coordinated transmission, as shown in the figure, the method includes the following steps.

Step 201: a UE report a signal measurement result.

Step 202: a coordinated transmission mode of the UE is determined according to the signal measurement result.

Step 203: a transmission service is provided for the UE according to the determined mode.

During implementation, in Step 201, the signal measurement result reported may include pilot strength and/or pilot signal-to-noise ratio of an anchor cell to which the UE belongs and the neighboring cells with the same frequency.

In the specific implementation, the network side may notify a UE with coordinated transmission receiving capability to perform coordinated transmission pilot measurement via measurement configuration signaling after the user establishes a connection. After the UE receives the measurement configuration signaling, it performs pilot strength measurement and reports according to the measurement event requirements.

The reports when the signal measurement result is pilot strength and pilot signal-to-noise ratio of the anchor cell to which the UE belongs and the neighboring cells with the same frequency respectively will be illustrated below. In implementation, the types of signal measurement results reported will be distinguished, so that it can be a criterion in Step 202 for determining the coordinated transmission mode of the UE.

1) When the signal measurement result includes pilot strength of the anchor cell to which the UE belongs and the neighboring cells with the same frequency, the signal measurement result may be reported by the UE in the following modes.

If the pilot strength of neighboring cells with the same frequency is larger than the pilot strength of the anchor cell, the UE reports a first type of signal measurement result that includes the pilot strength of the anchor cell and cell information of all the neighboring cells with pilot strength larger than that of the anchor cell, wherein the cell information includes a cell ID and pilot strength corresponding to the cell.

If the pilot strength of all neighboring cells with the same frequency is smaller than the pilot strength of the anchor cell, the UE reports a second type of signal measurement result that includes the pilot strength of the anchor cell and cell information of all the neighboring cells with pilot strength smaller than that of the anchor cell, wherein the cell information includes a cell ID and pilot strength corresponding to the cell.

In order to avoid repeated report, in implementation, the UE reports the first type of signal measurement result when the pilot strength of neighboring cells with the same frequency is larger than the pilot strength of the anchor cell by a first threshold ThD1.

In order to avoid repeated switching, in implementation, the UE reports the first type of signal measurement result with a delay of time T1; and/or, the UE reports the second type of signal measurement result with a delay of time T2.

In the specific implementation, reporting the first type of signal measurement result may be configured as measurement event 1 (for example, the existing event type A3 in LTE), if the pilot strength of neighboring cells with the same frequency is no lower than the pilot strength of the anchor cell by a certain threshold ThD1, a report event will be triggered, and the content reported will be: the pilot strength of the anchor cell, and the cell information of a set of cells that meet the condition, wherein the cell information mainly includes the cell ID and the corresponding pilot strength. The reporting mode may be event-triggered reporting, or event-triggered periodic reporting. In this mode, the reporting of a measurement report can be triggered when a UE moves from the center to the edge.

Reporting the second type of signal measurement result may be configured as measurement event 2, if the pilot strength of all neighboring cells with the same frequency is lower than the pilot strength of the anchor cell by a certain threshold ThD2, a report event will be triggered. The content reported may be the same as that of event 1, and to save signaling overhead, the content may not include all related information. Thus, when a UE moves from the edge to the center, coordinated transmission may be terminated by triggering this event report.

The measurement events 1 and 2 may be triggered with a certain triggering lag time T1 and T2, with the object to avoid repeated switching. The reason lies in that the establishment of lag time T may filter the rapid change of a measured value caused by shadow fading and fast fading of the signal, thus repeated and meaningless switching may be avoided.

2) When the signal measurement result includes the pilot signal-to-noise ratio of the anchor cell to which the UE belongs and the neighboring cells with the same frequency, the signal measurement result may be reported by the UE in the following mode.

If the pilot signal-to-noise ratio of neighboring cells with the same frequency is larger than the pilot signal-to-noise ratio of the anchor cell, the UE reports a first type of signal measurement result that includes a CQI of the anchor cell and cell information of all the neighboring cells with pilot signal-to-noise ratio larger than that of the anchor cell, wherein the cell information includes a cell ID and a CQI corresponding to the cell.

If the pilot signal-to-noise ratio of all neighboring cells with the same frequency is smaller than the pilot signal-to-noise ratio of the anchor cell, the UE reports a second type of signal measurement result that includes a CQI of the anchor cell and cell information of all the neighboring cells with pilot signal-to-noise ratio smaller than that of the anchor cell, wherein the cell information includes a cell ID and a CQI corresponding to the cell.

In implementation, the UE may report the CQIs of the anchor cell and the neighboring cells with the same frequency in the following mode.

An incorporated CQI is reported via joint processing; a UE performs joint channel estimation based on a reference signal in the anchor cell and reference signals in a set of coordinated neighboring cells, and feeds back the incorporated CQI, i.e., the UE performs joint channel estimation based on a reference signal in the anchor cell and reference signals in all neighboring cells with the same frequency, and feeds back the incorporated CQI.

Or, an independent CQI is reported; a UE performs channel estimation based on the reference signal in the anchor cell and each reference signal in a set of coordinated neighboring cells respectively, and feeds back the respective CQI, i.e., the UE performs channel estimation on each cell respectively based on a reference signal in the anchor cell and a reference signal in each of neighboring cells with the same frequency, and feeds back the CQI of each cell.

In order to avoid repeated switching, the UE may report the first type of signal measurement result with a delay of time T3; and/or, the UE may report the second type of signal measurement result with a delay of time T4.

In the specific implementation, reporting the first type of signal measurement result may be configured as measurement event 1, if it is measured that the measured value of the pilot signal-to-noise ratio of neighboring cells with the same frequency is no lower than the measured value of the pilot signal-to-noise ratio of the anchor cell by a certain threshold ThD3, a report event will be triggered, and the content reported will be: the CQI of the anchor cell and cell information of a set of cells that meet the condition, wherein the cell information mainly includes a cell ID and the corresponding CQI. The reporting mode may be event-triggered reporting, or event-triggered periodic reporting. In this mode, the reporting of a measurement report can be triggered when a UE moves from the center to the edge.

Reporting the second type of signal measurement result may be configured as measurement event 2, if the measured value of the pilot signal-to-noise ratio of all neighboring cells with the same frequency is lower than the measured value of the pilot signal-to-noise ratio of the anchor cell by a certain threshold ThD4, a report event will be triggered. The content reported may be the same as that of event 1, and to save signaling overhead, the content may not include all or part of the related information. Thus, when a UE moves from the edge to the center coordinated transmission may be terminated by triggering this event report.

The measurement events 1 and 2 may be triggered with a certain triggering lag time T3 and T4, with the object to avoid repeated switching.

It can be seen from the above implementation that, a UE can be made to actively report a first-type and a second type of signal measurement results by setting measurement report events. It will now be illustrated that how a coordinated transmission mode of a UE is determined in Step 202 according to such signal measurement results.

Figure 3:
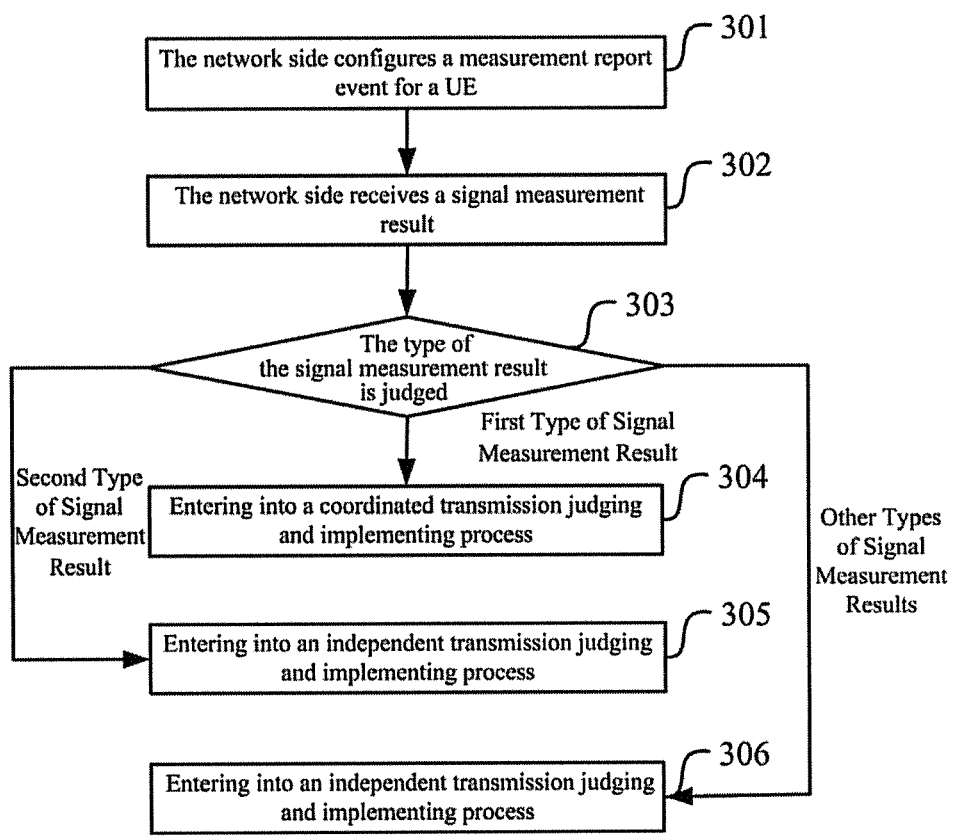
FIG. 3 is a schematic flow chart for judging a coordinated transmission mode in one embodiment of the invention.

FIG. 3 is a schematic flow chart for judging the coordinated transmission mode; as shown in the figure, it may include the following steps during judging.

Step 301: The network side configures a measurement report event for a UE.

The embodiment of the measurement report event configured in this step may be measurement event 1 or 2 as configured above. In practice, there are more than these two events, but the embodiments are illustrated with these two events as examples; if it is judged that the measurement report type is not measurement event 1 or 2, it may proceed to other predetermined processing procedures, and because these processing procedures are outside the scope of the invention, they will not be described.

Step 302: The network side receives a signal measurement result.

Step 303: The type of the signal measurement result is judged; if it is the first type of signal measurement result, it turns to Step 304, if it is the second type of signal measurement result, it turns to Step 305, and if it is a signal measurement result of other types, it turns to Step 306.

Step 304: It proceeds to a coordinated transmission judging and implementing process.

In this step, if the first type of signal measurement result triggered to be reported via measurement event 1 is received, it indicates that the UE may enter into the coordinated transmission mode, and a coordinated transmission service may be provided for the UE, thus it can proceed to the judging and implementing process needed by the subsequent coordinated transmission.

Step 305: It proceeds to an independent transmission judging and implementing process.

In this step, when the second type of signal measurement result triggered to be reported via measurement event 2 is received, it indicates that the UE enters into an independent transmission mode, and an independent transmission service should be provided for the UE, thus it proceeds to a judging and implementing process needed by the subsequent independent transmission. That is, when the signal measurement result reported by the UE is the second type of signal measurement result, it may be determined according to the second-type measurement result that the coordinated transmission mode of the UE is that no coordinated transmission is needed; therefore, an independent transmission service is provided for the UE.

Step 306: It proceeds to a predetermined processing procedure triggered by other events.

The Step 304 in which it proceeds to a coordinated transmission judging and implementing process will now be illustrated. In fact, in Step 304, it may be determined according to the first-type measurement result that the coordinated transmission mode of the UE is that coordinated transmission is needed; thus, the network side provides a coordinated transmission service for the UE.

Figure 4:
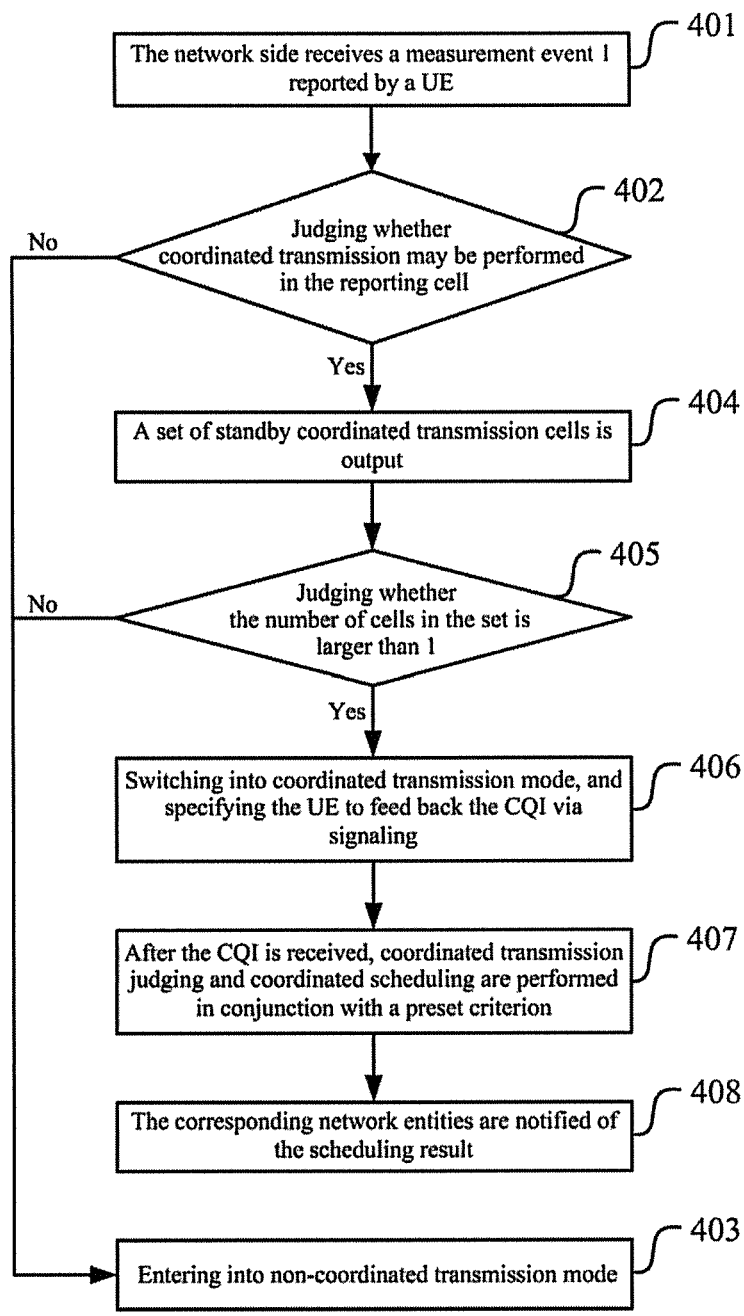
FIG. 4 is a schematic flow chart of a coordinated transmission service in one embodiment of the invention.

FIG. 4 is a schematic flow chart of a coordinated transmission service; as shown in the figure, the implementation of the preparation for providing a coordinated transmission service may include the following steps.

Step 401: The network side receives measurement event 1 reported by a UE.

Step 402: It judges whether coordinated transmission may be performed in the reported cell, if so, it turns to Step 404; otherwise, it turns to Step 403.

Step 403: it enters into a non-coordinated transmission mode; that is, it enters into an independent transmission mode.

Step 404: A set of standby coordinated transmission cells is output.

Step 405: It judges whether the number of cells in the set is larger than 1, if so, it turns to Step 406; otherwise, it turns to Step 403.

Step 406: It switches into a coordinated transmission mode, and specifies the UE to feed back the CQI via signaling.

Step 407: After the CQI is received, coordinated transmission judging and coordinated scheduling are performed in conjunction with a preset criterion.

Step 408: The corresponding network entities are notified of the scheduling result.

In implementation, for the UE that triggers event 1, the network side judges whether coordinated transmission may be performed according to the cell ID the UE reports, if a cell that meets the condition exists, it will be added to the set of coordinated transmission cells, and it turns to Step 404; otherwise, it enters the non-coordinated transmission mode of Step 403. That is, it determines a cell that can provide the coordinated transmission service for the UE among all the neighboring cells reported in the first type of signal measurement result, and provides the coordinated transmission service for the UE by the cell that can provide the coordinated transmission service for the UE.

In Step 402, the conditions for judging whether coordinated transmission may be performed in the reported cell may include, but not limited to:

if the corresponding coordinated transmission cell and the anchor cell have a capability that meet coordinated transmission data exchange and the corresponding cell itself supports coordinated transmission, it may be considered that the call may be added to the set of coordinated transmission cells of Step 404; for example, if the neighboring cell and the service cell that are reported belong to the same Node B entity, the cell is a cell in which coordinated transmission may be performed, and it may be added to the set of coordinated transmission cells.

During the judging of the set of coordinated transmission cells, it may further consider the load status, resource status and so on of the neighboring cells, for example, if the load of the neighboring cell is not heavy and there exists certain unoccupied resources, the neighboring cell may take part in coordinated transmission.

It may further consider the relation between the pilot strength of the neighboring cell and the pilot strength of the anchor cell, for example, if the pilot strength of the neighboring cell measured by the UE is no lower than a preset threshold, the neighboring cell may take part in coordinated transmission.

After the network side accomplishes judging of the set of coordinated transmission cells, if there exist more than one cells (including the anchor cell) that enter the coordinated standby set for a certain UE, transmission mode switching signaling is transmitted, the UE is notified to enter the coordinated transmission mode, and it turns to Step 406; otherwise, it enters into the non-coordinated transmission mode of Step 403.

In Step 406, it may simultaneously specify the user a mode for feeding back the CQI and whether other channel state parameters such as PMI need to be fed back in the signaling for specifying the transmission mode to the UE. By indicating the UE to measure and feed back the channel information of each cell in the cells that can provide a coordinated transmission service for the UE, the network side may determine a cell that takes part in providing coordinated transmission among the cells that can provide a coordinated transmission service for the UE according to the channel information fed back by the UE, and finally a coordinated transmission service is provided for the UE via the cells that take part in the coordinated transmission.

In the specific implementation, the content of the signaling for notifying the UE of the transmission mode in coordinated transmission mode may contain information such as the set of standby coordinated cells. The mode for feeding back CQI may also be the following modes or a combination thereof.

During multi-cell joint processing, the incorporated CQI is reported, that is, a UE performs joint channel estimation based on a reference signal in the anchor cell and reference signals in a set of coordinated neighboring cells, and feeds back the incorporated CQI, i.e., the UE performs joint channel estimation based on a reference signal in the anchor cell and reference signals in all neighboring cells with the same frequency, and feeds back the incorporated CQI.

Or, the independent CQIs of multiple cells are reported respectively; a UE performs channel estimation based on the reference signal in the anchor cell and each reference signal in a set of coordinated neighboring cells respectively, and feeds back the respective CQI, that is, the UE performs channel estimation on each cell respectively based on a reference signal in the anchor cell and a reference signal in each of neighboring cells with the same frequency, and feeds back the CQI of each cell.

At the same time, to reduce the amount of information, it may be specified that the UE only reports the CQIs of the cells that meet a certain condition; for example, the UE only reports the CQIs corresponding to the neighboring cells with signal-to-noise ratio measured no lower than that of the anchor cell by 3 dB.

After the above information is obtained, the network side may perform coordinated transmission judging and coordinated transmission scheduling in Step 407 according to the CQI and other channel state information (for example, PMI) fed back by the UE in conjunction with a preset criterion (for example, throughput maximization).

The network side transmits data for the user according to the scheduling result. In implementation, according to the practical scheduling situation, the related content may be indicated to a related network entity via scheduling signaling and/or an interface message, wherein the related content may be, for example, the time-frequency resources that can be used by the user during this scheduling, the cells that perform coordinated transmission, and the port information of the cells that perform coordinated transmission.

If the coordinated cells lie in the same base station, the neighboring cells may be notified of the current scheduling information via an internal message.

If the coordinated cells lie in different base stations, the neighboring cells may be notified of the current scheduling information via an interface message, for example, via X2 interface in the LTE system.

It can be easily understood that, correspondingly, during coordinated transmission, if the measurement event 2 occurs, the UE may notify the network side via signaling. If the service cell receives the reported measurement event 2, the corresponding network entities including the UE may be notified in a signaling process to terminate the coordinated transmission mode and switch to the independent transmission mode. Because various technologies may be employed in practice, the non-coordinated transmission mode includes, but not limited to, the independent transmission mode.

If switching occurs during coordinated transmission, the service cell is updated according to the switching process, and it may continue the coordinated transmission mode, or it may convert to the default transmission mode, and it returns to Step 401 for transmitting signaling and restart the above process.

Based on the same inventive conception, one embodiment of the invention further provides a system, a network side device and a UE for coordinated transmission. Because the principle for addressing problems employed by these devices is similar to the method for coordinated transmission, for the implementation of these devices, reference can be made to the implementation of the method, and the repeated contents will be omitted here.

Illustrations will now be first given on the coordinated transmission system, and then on the specific embodiments of the UE and the network side device that constitute the system respectively.

Figure 5:
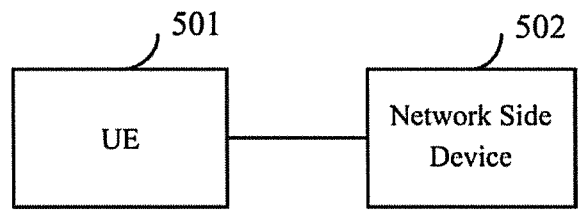
FIG. 5 is a structural representation of a system for coordinated transmission in one embodiment of the invention.

FIG. 5 is a structural representation of a system for coordinated transmission; as shown in the figure, the system may include:

a UE 501, configured to report a signal measurement result; and a network side device 502, configured to determine a coordinated transmission mode of the UE according to the signal measurement result, and provide a transmission service for the UE according to the determined mode.

In implementation, the signal measurement result may include the pilot strength and/or the pilot signal-to-noise ratio of the anchor cell to which the UE belongs and the neighboring cells with the same frequency; for the situations that the signal measurement results are the pilot strength and the pilot signal-to-noise ratio of the anchor cell to which the UE belongs and the neighboring cells with the same frequency respectively, the UE may implement in the following modes.

1) The UE may be further configured to: report a first type of signal measurement result that includes the pilot strength of the anchor cell and cell information of all the neighboring cells with pilot strength larger than that of the anchor cell when the pilot strength of neighboring cells with the same frequency is larger than the pilot strength of the anchor cell, wherein the cell information includes a cell ID and pilot strength corresponding to the cell; and report a second type of signal measurement result that includes the pilot strength of the anchor cell and cell information of all the neighboring cells with pilot strength smaller than that of the anchor cell when the pilot strength of all neighboring cells with the same frequency is smaller than the pilot strength of the anchor cell, wherein the cell information includes a cell ID and pilot strength corresponding to the cell.

2) The UE may be further configured to: report a first type of signal measurement result that includes a CQI of the anchor cell and cell information of all the neighboring cells with pilot signal-to-noise ratio larger than that of the anchor cell when the pilot signal-to-noise ratio of neighboring cells with the same frequency is larger than the pilot signal-to-noise ratio of the anchor cell, wherein the cell information includes a cell ID and a CQI corresponding to the cell; and report a second type of signal measurement result that includes a CQI of the anchor cell and cell information of all the neighboring cells with pilot signal-to-noise ratio smaller than that of the anchor cell when the pilot signal-to-noise ratio of all neighboring cells with the same frequency is smaller than the pilot signal-to-noise ratio of the anchor cell, wherein the cell information includes a cell ID and a CQI corresponding to the cell.

In the above two situations, in order to avoid repeated switching, the UE may be further configured to report the first type of signal measurement result with a delay; and/or, report the second type of signal measurement result with a delay.

When it determines the coordinated transmission mode according to the signal measurement result reported by the UE, the network side device may be further configured to: determine that the coordinated transmission mode of the UE is that no coordinated transmission is needed according to the second type of signal measurement result and provide an independent transmission service for the UE, when the signal measurement result reported is the second type of signal measurement result; and determine that the coordinated transmission mode of the UE is that coordinated transmission is needed according to the first type of signal measurement result and provide a coordinated transmission service for the UE, when the signal measurement result reported is the first type of signal measurement result.

When it is determined that coordinated mode transmission needs to be performed on the UE, the network side device may be further configured to: determine a cell that takes part in providing coordinated transmission among the cells that can provide a coordinated transmission service for the UE according to the channel information fed back by the UE, after indicating the UE to measure and feed back the channel information of each cell in the cells that can provide a coordinated transmission service for the UE; and provide a coordinated transmission service for the UE by the cell that takes part in the coordinated transmission.

After obtaining the indication from the network side device, when the UE feeds back as indicated, the UE may be further configured to: perform joint channel estimation based on a reference signal in the anchor cell and reference signals in all neighboring cells with the same frequency, and feed back the incorporated CQI; or, perform channel estimation on each cell respectively based on a reference signal in the anchor cell and a reference signal in each of neighboring cells with the same frequency, and feed back the CQI of each cell.

The UE may be further configured to feed back the CQIs of the neighboring cells with pilot signal-to-noise ratio larger than that of the anchor cell.

Figure 6:
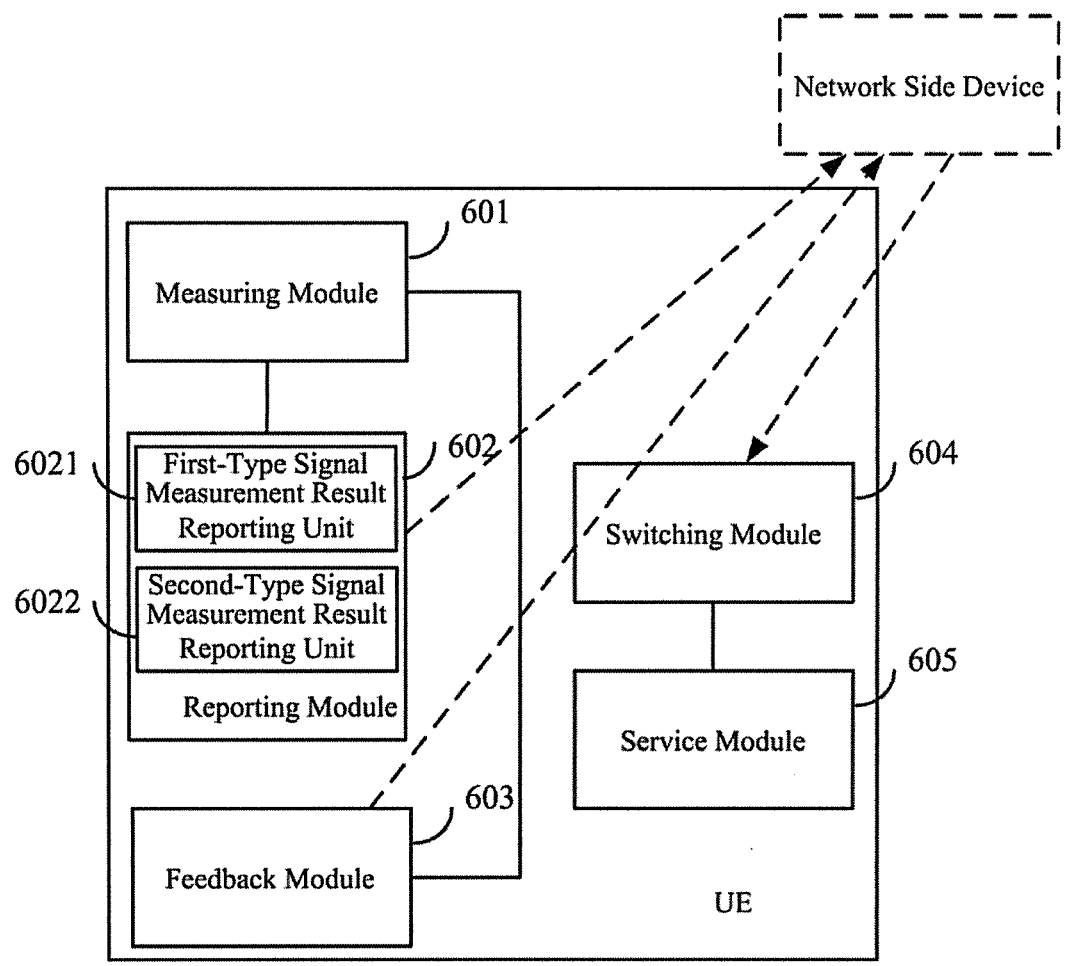
FIG. 6 is a structural representation of a UE in one embodiment of the invention.

FIG. 6 is a structural representation of a UE; as shown in the figure, the UE may include:

a measuring module 601, configured to measure signals of a anchor cell and neighboring cells with the same frequency; and a reporting module 602, configured to report a signal measurement result used for a coordinated transmission service.

In implementation, the reporting module of the UE may be further configured to report the signal measurement result that includes pilot strength and/or pilot signal-to-noise ratio of the anchor cell to which the UE belongs and the neighboring cells with the same frequency.

The reporting module may includes:

a first-type signal measurement result reporting unit 6021, configured to report a first type of signal measurement result that includes the pilot strength of the anchor cell and cell information of all the neighboring cells with pilot strength larger than that of the anchor cell when the pilot strength of neighboring cells with the same frequency is larger than the pilot strength of the anchor cell, wherein the cell information includes a cell ID and pilot strength corresponding to the cell; and a second-type signal measurement result reporting unit 6022, configured to report a second type of signal measurement result that includes the pilot strength of the anchor cell and cell information of all the neighboring cells with pilot strength smaller than that of the anchor cell when the pilot strength of all neighboring cells with the same frequency is smaller than the pilot strength of the anchor cell, wherein the cell information includes a cell ID and pilot strength corresponding to the cell.

In another embodiment, the reporting module includes:

a first-type signal measurement result reporting unit 6021, configured to report a first type of signal measurement result that includes a CQI of the anchor cell and cell information of all the neighboring cells with pilot signal-to-noise ratio larger than that of the anchor cell when the pilot signal-to-noise ratio of neighboring cells with the same frequency is larger than the pilot signal-to-noise ratio of the anchor cell, wherein the cell information includes a cell ID and a CQI corresponding to the cell; and a second-type signal measurement result reporting unit 6022, configured to report a second type of signal measurement result that includes the CQI of the anchor cell and cell information of all the neighboring cells with pilot signal-to-noise ratio smaller than that of the anchor cell when the pilot signal-to-noise ratio of all neighboring cells with the same frequency is smaller than the pilot signal-to-noise ratio of the anchor cell, wherein the cell information includes a cell ID and a CQI corresponding to the cell.

When the CQIs are fed back, the first-type signal measurement result reporting unit and/or the second-type signal measurement result reporting unit may be further configured to perform joint channel estimation based on a reference signal in the anchor cell and reference signals in all neighboring cells with the same frequency and feed back an incorporated CQI, or perform channel estimation on each cell respectively based on a reference signal in the anchor cell and a reference signal in each of neighboring cells with the same frequency and feed back a CQI of each cell, when reporting the CQIs of the anchor cell and the neighboring cells with the same frequency.

In order to avoid repeated switching, the first-type signal measurement result reporting unit may be further configured to report the first type of signal measurement result with a delay; and/or, the second-type signal measurement result reporting unit may be further configured to report the second type of signal measurement result with a delay.

When the network side device determines that coordinated transmission needs to be performed on the UE, according to the channel information feedback indication of the network side, the UE may further include:

a feedback module 603, configured to feed back channel information of each of cells that can provide the coordinated transmission service for the UE according to the indication.

In implementation, the feedback module may be further configured to perform joint channel estimation based on a reference signal in the anchor cell and reference signals in all neighboring cells with the same frequency and feed back an incorporated CQI, or perform channel estimation on each cell respectively based on a reference signal in the anchor cell and a reference signal in each of neighboring cells with the same frequency and feed back a CQI of each cell.

The feedback module may be further configured to feed back CQIs of neighboring cells with pilot signal-to-noise ratio larger than that of the anchor cell.

Because the UE may be in both coordinated transmission situation and independent transmission situation, the UE may further include:

a switching module 604, configured to switch between a coordinated transmission mode and a non-coordinated transmission mode according to an indication; and a service module 605, configured to provide a data transmission service according to the switched mode.

Figure 7:
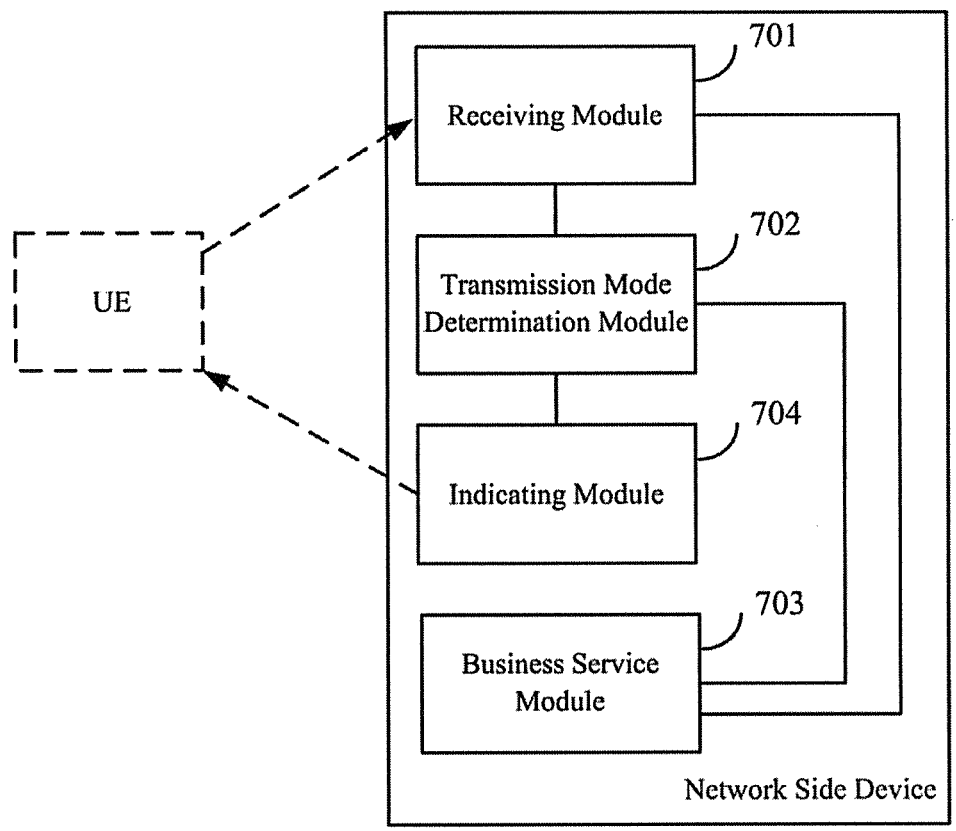
FIG. 7 is a structural representation of a network side device in one embodiment of the invention.

FIG. 7 is a structural representation of the network side device; as shown in the figure, the network side device may include:

a receiving module 701, configured to receive a signal measurement result reported;

a transmission mode determination module 702, configured to determine a coordinated transmission mode of a UE according to the signal measurement result; and a business service module 703, configured to provide a transmission service for the UE according to the determined mode.

In implementation, the reported signal measurement result may include the pilot strength and/or the pilot signal-to-noise ratio of the anchor cell to which the UE belongs and the neighboring cells with the same frequency, thus the receiving module may be further configured to receive the signal measurement result that includes the pilot strength and/or the pilot signal-to-noise ratio of the anchor cell to which the UE belongs and the neighboring cells with the same frequency.

Specifically, the receiving module may be further configured to receive a first type of signal measurement result and/or a second type of signal measurement result, wherein:

the first type of signal measurement result is a signal measurement result reported by the UE when the pilot strength of neighboring cells with the same frequency is larger than the pilot strength of the anchor cell, and includes the pilot strength of the anchor cell and cell information of all the neighboring cells with pilot strength larger than that of the anchor cell; and the second type of signal measurement result is a signal measurement result reported by the UE when the pilot strength of all neighboring cells with the same frequency is smaller than the pilot strength of the anchor cell, and includes the pilot strength of the anchor cell and cell information of all the neighboring cells with pilot strength smaller than that of the anchor cell, wherein the cell information includes a cell ID and pilot strength corresponding to the cell; or the first type of signal measurement result is a signal measurement result reported by the UE when the pilot signal-to-noise ratio of neighboring cells with the same frequency is larger than the pilot signal-to-noise ratio of the anchor cell, and includes a CQI of the anchor cell and cell information of all the neighboring cells with pilot signal-to-noise ratio larger than that of the anchor cell; and the second type of signal measurement result is a signal measurement result reported by the UE when the pilot signal-to-noise ratio of all neighboring cells with the same frequency is smaller than the pilot signal-to-noise ratio of the anchor cell, and includes a CQI of the anchor cell and cell information of all the neighboring cells with pilot signal-to-noise ratio smaller than that of the anchor cell, wherein the cell information includes a cell ID and a CQI corresponding to the cell; and the transmission mode determination module may be further configured to determine that the UE needs to be in a coordinated transmission mode according to the first type of signal measurement result, and determine that the UE needs to be in a non-coordinated transmission mode according to the second type of signal measurement result.

When the network side device determines that coordinated transmission needs to be performed on the UE, the network side may further include:

an indicating module 704, configured to indicate the UE to measure and feed back channel information of each of cells that can provide a coordinated transmission service for the UE; and after the UE feeds back, the business service module may be further configured to determine a cell that takes part in providing coordinated transmission among the cells that can provide the coordinated transmission service for the UE according to the channel information fed back by the UE, and provide the coordinated transmission service for the UE by the cell that takes part in the coordinated transmission.

The indicating module may be further configured to indicate the UE to measure and feed back the channel information that includes CQIs of the anchor cell to which the UE belongs and the neighboring cells with the same frequency.

It should be noted that, in one embodiment of the invention, for a distributed radio communication system, the service cell and neighboring cells, etc., mentioned in the above embodiments are all virtual cells, which consist of one or more radio frequency transceiving units and a computing and controlling unit, where the radio frequency transceiving unit is responsible for transmitting data to a UE, and the computing and controlling unit is responsible for signaling configuration and scheduling determination, etc. The solution in the embodiments of the invention may also be employed between a plurality of radio frequency transceiving units and/or a plurality of computing and controlling units for coordinated scheduling and coordinated transmission, and the technical problems addressed in the embodiments can also be addressed here.

It can be known from the above embodiments that, in a cellular cell, for a cell edge user, the channel quality is very poor and the spectrum efficiency is very low, because the valid signal received is weak and interference from neighboring cells are strong, thus the user QoS cannot be guaranteed; therefore, a CoMP technology is introduced, the signal quality received by the user is improved via coordinated scheduling or coordinated transmission of a plurality of cells, and inter-cell interference is controlled effectively, so that the spectrum efficiency of the edge user can be improved effectively.

However, it is a key point to implement the CoMP technology that how a user set and a UE set suitable for coordinated transmission are selected. Thus, a coordinated transmission solution is given in one embodiment of the invention, and by measuring and reporting a signal (for example, pilot signal strength and pilot signal signal-to-noise ratio) via a UE, the network side may judge whether the UE needs coordinated transmission according to the result reported, and indicate the UE to perform the necessary transmission mode switching via upper-layer signaling, and inform the UE of a possible set of coordinated transmission cells. Moreover, the UE continues to measure the channel information of each cell in the set of coordinated transmission cells (for example, CQI and PMI) for coordinated transmission judging and coordinated transmission scheduling; moreover, it may transmit data for the user according to the scheduling result. Therefore, signals from multiple cells can be detected in coordination when some UEs are scheduled via multi-cell coordination by using the CoMP technology, and the corresponding network entities (including the UE, the service cell and the neighboring cells that take part in the coordinated transmission) are made to known the related information of coordinated scheduling, thereby overcoming the defect that CoMP requirements cannot be met due to the independent transmission mode between the existing LTE network and UE. Compared with the prior art, in the solutions of the embodiments of the invention, multi-cell coordinated transmission may be effectively accomplished, and the throughput of edge users may be improved.

Illustrations will now be given on the specific embodiments of a method, a system and an apparatus for determining time-frequency resources, by which time-frequency resources can be coordinately scheduled among a plurality of cells.

In one embodiment of the invention, a first scheduling device determines a coordinated cell corresponding to a coordinately scheduled UE that belongs to the anchor cell, sends information of time-frequency resources preallocated to the coordinated scheduling UE to a second scheduling device corresponding to the coordinated cell, and indicates the second scheduling device to determine whether to perform coordinated scheduling on the coordinately scheduled UE according to the information of the time-frequency resources, and then the first scheduling device determines time-frequency resources allocated to the coordinately scheduled UE according to the result whether the second scheduling device performs coordinated scheduling on the coordinately scheduled UE, so that the time-frequency resources may be scheduled after negotiation is performed by a plurality of cells, thereby improving the spectrum efficiency of the cell and the rate of the cell edge UEs.

One scheduling device corresponds to one cell, for scheduling the time-frequency resources in the cell corresponding thereto.

Figure 8:
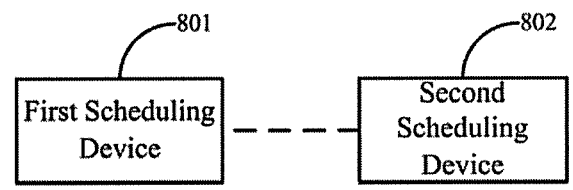
FIG. 8 is a structural representation of a system for determining time-frequency resources in one embodiment of the invention.

As shown in FIG. 8, in one embodiment of the invention, a system for determining time-frequency resources includes a first scheduling device 801 and a second scheduling device 802.

The first scheduling device 801 is configured to determine a coordinately scheduled UE that belongs to a anchor cell corresponding to the first scheduling device, determine a coordinated cell corresponding to the coordinately scheduled UE, send information of time-frequency resources preallocated to the coordinately scheduled UE, and determine time-frequency resources allocated to the coordinately scheduled UE according to the result whether the second scheduling device corresponding to the coordinated cell performs coordinated scheduling on the coordinately scheduled UE.

The coordinately scheduled UE is a UE that can receive signals from the anchor cell and another coordinated cell.

The second scheduling device 802 corresponding to the coordinated cell is configured to determine whether to perform coordinated scheduling on the coordinately scheduled UE according to the information of the time-frequency resources received from the first scheduling device 801.

In a specific implementing process, the first scheduling device 801 may send the information of the time-frequency resources preallocated to the coordinately scheduled UE via a coordinated scheduling request.

It should be noted that, if the coordinately scheduled UE corresponds to a plurality of coordinated cells, the first scheduling device 801 will send a coordinated scheduling request to the second scheduling device 802 of each coordinated cell corresponding to the coordinately scheduled UE.

If the first scheduling device 801 and the second scheduling device 802 belong to the same base station, they interact via an internal data interface; if the first scheduling device 801 and the second scheduling device 802 belong to different base stations, they interact via a communication interface between the base stations.

If this embodiment is based on an LTE system, the communication interface between base stations is an X2 interface.

Figure 9:
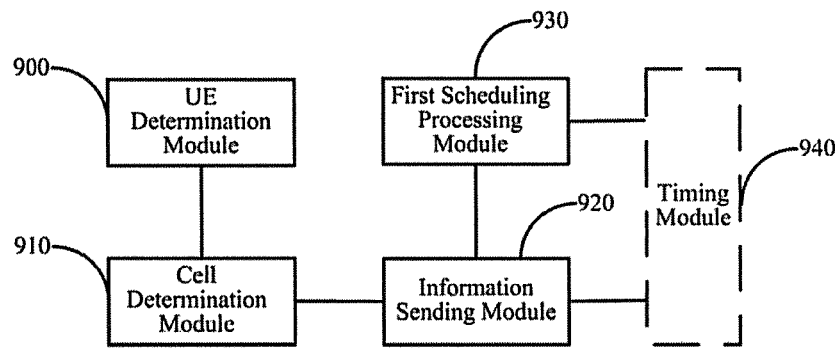
FIG. 9 is a structural representation of a first scheduling device in one embodiment of the invention.

As shown in FIG. 9, the first scheduling device according to one embodiment of the invention includes: a UE determination module 900, a cell determination module 910, an information sending module 920 and a first scheduling processing module 930.

The UE determination module 900 is configured to determine a coordinately scheduled UE that belongs to an anchor cell corresponding to the scheduling device.

The coordinately scheduled UE is a UE that can receive signals from the anchor cell and other coordinated cells, that is, the coordinately scheduled UE can at least receive the signals from at least two cells.

In a specific implementing process, the UE determination module 900 obtains information of resources in the cell corresponding thereto and information of a UE that needs to be scheduled in the cell (including coordinately scheduled UE and non-coordinately scheduled UE), respectively.

The resource information of the cell includes, but not limited to, one or more of the following information:

cell frequency, cell bandwidth, the overall available time-frequency resources in the cell and the maximum number of resources that can be used for coordinated scheduling (i.e., the resources for coordinated scheduling).

The UE information includes, but not limited to, one or more of the following information:

UE identifier, anchor cell identifier, UE QoS information, UE cached data amount and UE channel quality (where, for coordinated transmission, channel quality should include the quality of channels between a UE and a plurality of cells) information.

The UE determination module 900 may divide the UEs into non-coordinately scheduled UEs and coordinately scheduled UEs according to the information of the UEs of the anchor cell, such as channel quality. Where the non-coordinately scheduled UEs only occupy the resources of the anchor cell thereof. A method for distinguishing between the coordinately scheduled UEs and the non-coordinately scheduled UEs is as follows: the UEs in the cell center are non-coordinately scheduled UEs, and the UEs on the cell edge are coordinately scheduled UEs.

Of course, this embodiment is not limited to the above dividing mode, and other modes that can divide the non-coordinately scheduled UEs may also be applicable for this embodiment.

The cell determination module 910 is configured to determine the coordinated cell corresponding to the coordinately scheduled UE determined by the UE determination module 900.

The mode for the cell determination module 910 to determine a coordinated cell corresponding to the coordinately scheduled UE includes, but not limited to, one of the following modes:

a coordinated cell corresponding to the coordinately scheduled UE is determined from the user information, a coordinated cell corresponding to the UE as reported by the UE itself.

The information sending module 920 is configured to send information of time-frequency resources preallocated to the coordinately scheduled UE to a scheduling device corresponding to the coordinated cell.

When the information sending module 920 preallocates time-frequency resources to the coordinately scheduled UE, it may preallocate time-frequency resources to the coordinately scheduled UE according to the attributes such as the Buffer data information amount of the UE, the QoS of the UE (similar to the existing independent scheduling UE). Similarly, a non-coordinately scheduled UE may also be allocated time-frequency resources in such a mode. In one embodiment, some time-frequency resources may be preset in the cell, which are specially allocated to the coordinately scheduled UEs in the anchor cell, and the time-frequency resources preset by different cells are preferably different; for example, for three cells in an LTE system, the time-frequency resources configured by the first cell are resources with physical resource block (PRB) identifiers of 1-15, the time-frequency resources configured by the second cell are resources with PRB identifiers of 16-30, and the time-frequency resources configured by the third cell are resources with PRB identifiers of 31-45.

Before the time-frequency resources are preallocated, the information sending module 920 may further queue the priorities of the UEs in the anchor cell (including non-coordinately scheduled UEs and coordinately scheduled UEs) according to a certain principle, for example, according to PF algorithm; after queuing is accomplished, time-frequency resources are preallocated to the UEs in the queue according to the priority order. However, it may only perform priority queuing on the coordinately scheduled UEs in the anchor cell and then preallocate time-frequency resources to the coordinately scheduled UEs; after resources are preallocated to the coordinately scheduled UEs, the time-frequency resources are allocated to non-coordinately scheduled UEs.

After time-frequency resource preallocation is accomplished, the information sending module 920 sends the information of the time-frequency resources preallocated to the coordinately scheduled UE to the coordinated cell corresponding to the coordinately scheduled UE, and indicates the scheduling device in the coordinated cell to determine whether to perform coordinated scheduling on the coordinately scheduled UE according to the information of the time-frequency resources, that is, it requires the coordinated cell to schedule the coordinately scheduled UE by using the same time-frequency resources.

In a specific implementing process, the information sending module 920 may send the information of the time-frequency resources preallocated to the coordinately scheduled UE via a coordinated scheduling request.

If the coordinately scheduled UE corresponds to a plurality of coordinated cells, the information sending module 920 sends a coordinated scheduling request to each coordinated cell.

The coordinated scheduling request may further include one or more of UE identifier and the information needed by other physical layer processing.

The first scheduling processing module 930 is configured to determine time-frequency resources allocated to the coordinately scheduled UE according to a result whether a scheduling device corresponding to the coordinated cell performs coordinated scheduling on the coordinately scheduled UE.

The first scheduling processing module 930 may determine the time-frequency resources allocated to the coordinately scheduled UE according to a determination result after receiving the determination result from another scheduling device.

Here, it needs to be noted that, the object for sending the information of the time-frequency resources to other scheduling devices is that the coordinated cells are required to schedule the coordinately scheduled UE by using the same time-frequency resources. At this point, there may appear three situations:

1) the corresponding time-frequency resources in another cell cannot be allocated to the coordinately scheduled UE; 2) all the corresponding time-frequency resources in another cell can be allocated to the coordinately scheduled UE; and 3) a part of the corresponding time-frequency resources in another cell can be allocated to the coordinately scheduled UE.

The determination result is also divided into three situations corresponding to the above three situations.

Situation 1: coordinated scheduling rejected.

The first scheduling processing module 930 takes the time-frequency resources preallocated to the coordinated scheduling UE by the information sending module 920 as the time-frequency resources allocated to the coordinately scheduled UE.

Situation 2: coordinated scheduling agreed.

The first scheduling processing module 930 takes the time-frequency resources preallocated to the coordinated scheduling UE by the information sending module 920 as the time-frequency resources allocated to the coordinately scheduled UE.

Situation 3: coordinated processing agreed, and information of the time-frequency resources received together with determination result; at this point, the first scheduling processing module 930 has two processing modes:

Processing Mode 1: The first scheduling processing module 930 takes the time-frequency resources preallocated to the coordinated scheduling UE by the information sending module 920 as the time-frequency resources allocated to the coordinately scheduled UE (in this mode, the time-frequency resources allocated to the coordinated scheduling UE by the anchor cell are different from those by the coordinated cell).

Processing Mode 2: The first scheduling processing module 930 takes the time-frequency resources of the cell thereof corresponding to the received information of the time-frequency resources that are not allocated as the time-frequency resources allocated to the coordinately scheduled UE (in this mode, the time-frequency resources allocated to the coordinated scheduling UE by the anchor cell are the same as those by the coordinated cell).

If there exist a plurality of coordinated cells, and a part of the corresponding time-frequency resources in a part of the coordinated cells can be allocated to the coordinately scheduled UE, each cell may schedule by using the time-frequency resources allocated to the coordinately scheduled UE by itself;

Negotiation may be performed between cells, and the same part of time-frequency resources in each cell are allocated to the coordinately scheduled UE; for example, for the three cells in an LTE system, the time-frequency resources of the anchor cell are resources with PRB identifiers of 1-15, and the time-frequency resources of the other two coordinated cells are resources with PRB identifiers of 1-10 and 5-15 respectively, then after negotiation, the three cells all use the resources with PRB identifiers of 5-10;

If each cell does not have the same part of time-frequency resources allocated to the coordinately scheduled UE, each cell may schedule by using the time-frequency resources allocated to the coordinately scheduled UE by itself.

In a specific implementing process, after determining the allocated time-frequency resources, the first scheduling processing module 930 sends a signal to the coordinately scheduled UE of the anchor cell via the allocated time-frequency resources.

In one embodiment, the first scheduling processing module 930 may also determine the transmission rate level according to whether coordinated scheduling is successful and then determine the number of bits of the transmission blocks according to the determined rate level, and send a signal to the coordinately scheduled UE via the time-frequency resources allocated to the coordinately scheduled UE according to the number of bits of the transmission blocks determined.

There are various modes for determining the transmission rate level; for example, a corresponding relationship between the determination result and the coordinated scheduling may be preset, and then the transmission rate level is determined according to the corresponding relationship; or, the UE may be informed of the determination result, and then the UE returns the transmission rate level.

It should be noted that, this embodiment is not limited to the above two modes, and any mode in which the transmission rate level can be determined according to whether coordinated scheduling is successful is applicable for this embodiment.

The mode for determining the number of bits of the transmission blocks according to the determined rate level is decided according to the system in which the scheduling device lies, for example, the scheduling device lies in an LTE system, then the number of bits of the transmission blocks=the code rate corresponding to the transmission code rate level×the number of PRBs finally allocated×the number of symbols of each PRB.

In a specific implementing process, the scheduling device in this embodiment may not receive the determination result from another scheduling device due to the factors such as the network. To solve this problem, the scheduling device of this embodiment may further include a timing module 940.

The timing module 940 is configured to determine that the scheduling device corresponding to the coordinated cell rejects coordinated scheduling if no determination result is received in a set feedback time, after the information sending module 920 sends the information of the time-frequency resources and before the first scheduling processing module 930 determines the time-frequency resources allocated to the coordinately scheduled UE.

Thus, after negotiation is failed, the first scheduling processing module 930 carries out the corresponding processing according to the determination result is coordinated scheduling rejected.

Because the communication interface may have a certain time delay, the information sending module 920 may also determine a resource time point; and in order to avoid the frequent sending of a coordinated scheduling request, the information sending module 920 may also determine resource duration.

The information sending module 920 sends the resource time point and the resource duration together with the information of the time-frequency resources preallocated to the coordinately scheduled UE; for example, the resource time point, the resource duration and the information of the time-frequency resources preallocated to the coordinately scheduled UE may all be placed in a coordinated scheduling request for sending.

The first scheduling processing module 930 determines effective time of the allocated time-frequency resources according to the resource time point and the resource duration.

Moreover, the first scheduling processing module 930 sends a signal to the coordinately scheduled UE of the anchor cell via the allocated time-frequency resources in the effective time.

After the effective time of the time-frequency resources elapses, the UE determination module 900 re-determines a coordinately scheduled UE, and other modules also restart the corresponding processings.

Where, resource time point=the current time when the information sending module 920 sends a coordinated scheduling request+delay time. The delay time and the resource duration are preset as required.

In a specific implementing process, the feedback time set in the timing module 940 is preferably smaller than the delay time.

For the non-coordinately scheduled UEs, a resource time point (resource time point=starting point of the next scheduling period+delay time) and resource duration may also be set; in one embodiment, the resource time point of the non-coordinately scheduled UE is smaller than the resource time point in the coordinately scheduled UE, and the resource duration of the non-coordinately scheduled UE is smaller than the resource duration of the coordinately scheduled UE.

Figure 10:
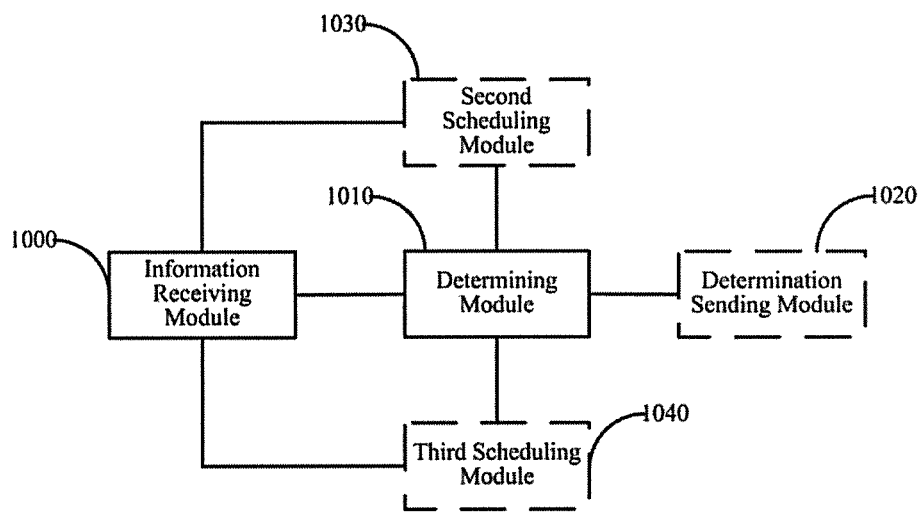
FIG. 10 is a structural representation of a second scheduling device in one embodiment of the invention.

As shown in FIG. 10, the second scheduling device according to one embodiment of the invention includes an information receiving module 1000 and a determining module 1010.

The information receiving module 1000 is configured to receive information of time-frequency resources.

If a coordinated scheduling request is received, the information of the time-frequency resources may be extracted from the coordinated scheduling request.

The determining module 1010 is configured to determine whether to perform coordinated scheduling on a coordinately scheduled UE in another cell according to the information of the time-frequency resources received by the information receiving module 1000.

The determining module 1010 obtains a determination result after it determines whether to perform coordinated scheduling on the coordinately scheduled UE according to the information of the time-frequency resources.

The scheduling device according to the embodiment of the invention may further include a determination sending module 1020.

The determination sending module 1020 is configured to return the determination result obtained by the determining module 1010.

In a specific implementing process, the determination sending module 1020 may send the determination result via a coordination request acknowledgement message.

If the information receiving module 1000 receives the information of the time-frequency resources of a plurality of scheduling devices, the determining module 1010 needs to obtain the corresponding determination result according to each information of time-frequency resources; correspondingly, the determination sending module 1020 needs to send each determination result to the corresponding scheduling device.

The determining module 1010 may obtain the determination result in two modes:

Mode 1: The determining module 1010 determines whether time-frequency resources corresponding to the information of the time-frequency resources in the anchor cell corresponding thereto are allocated, for example, if in an LTE system, the information of the time-frequency resources received are resources with PRB identifiers of 1-15, the determining module 1010 examines whether resources with PRB identifiers of 1-15 in the anchor cell are allocated;

When the time-frequency resources are completely allocated, the determination result obtained is coordinated scheduling rejected;

When no time-frequency resources are allocated, the determination result obtained is coordinated scheduling agreed;

When the time-frequency resources are partially allocated, the determination result obtained is coordinated scheduling agreed or rejected.

If the determination result obtained is coordinated scheduling agreed when the time-frequency resources are partially allocated, it determines information of time-frequency resources that are not allocated, then the determination sending module 1020 sends the determination result together with the information of the time-frequency resources that are not allocated.

Mode 2: The priorities of coordinated scheduling and non-coordinated scheduling are preset;

The determining module 1010 determines whether the time-frequency resources corresponding to the information of the time-frequency resources in the anchor cell corresponding thereto are allocated;

When the time-frequency resources are completely allocated to a non-coordinately scheduled UE and the priority of coordinated scheduling is preset to be higher than the priority of non-coordinated scheduling, the time-frequency resources are reallocated to the coordinately scheduled UE (i.e., coordinated scheduling occupies the resources of non-coordinated scheduling) and a determination result of coordinated scheduling agreed is obtained.

It should be noted that, other situations of Mode 2 are similar to those of Mode 1, thus repeated description will be omitted here.

In one embodiment, a threshold may also be preset. Then, before determining the determination result, the determining module 1010 first determines whether the number of the time-frequency resources for coordinated scheduling is smaller than the threshold, if so, it continues to determine; otherwise, it directly determines that the determination result is coordinated scheduling rejected.

In a specific implementing process, the type and size of the threshold may be configured as required; for example, the threshold may be a percentage, then it examines whether the percentage of the number of time-frequency resources for coordinated scheduling in the number of resources in the whole cell is smaller than the threshold; the threshold may also be a specific numerical value, then it directly examines whether the number of the time-frequency resources for coordinated scheduling is smaller than the threshold.

For Mode 1 for obtaining the determination result, the scheduling device according to one embodiment of the invention may further include a second scheduling module 1030.

The second scheduling module 1030 is configured to allocate the time-frequency resources in the cell it lies in corresponding to the information of the time-frequency resources received by the information receiving module 1000 to the coordinately scheduled UE in the cell that sends the information of the time-frequency resources, when no time-frequency resources are allocated and the determination result obtained by the determining module 1010 is coordinated scheduling agreed; and allocate the time-frequency resources that are not allocated in the cell it lies in corresponding to the information of the time-frequency resources received by the information receiving module 1000 to the coordinately scheduled UE in the cell that sends the information of the time-frequency resources, when time-frequency resources are partially allocated and the determination result obtained by the determining module 1010 is coordinated scheduling agreed.

In a specific implementing process, if the information receiving module 1000 further receives a resource time point and resource duration in addition to the information of the time-frequency resources, the second scheduling module 1030 determines the effective time of the allocated time-frequency resources according to the resource time point and the resource duration.

For Mode 2 for obtaining the determination result, the scheduling device according to one embodiment of the invention may further include a third scheduling module 1040.

The third scheduling module 1040 is configured to allocate the time-frequency resources in the cell it lies in corresponding to the information of the time-frequency resources received by the information receiving module 1000 to the coordinately scheduled UE in the cell that sends the information of the time-frequency resources (i.e., coordinated scheduling occupies the resources of non-coordinated scheduling).

In a specific implementing process, if the information receiving module 1000 further receives a resource time point and resource duration in addition to the information of the time-frequency resources, the third scheduling module 1040 determines the effective time of the allocated time-frequency resources according to the resource time point and the resource duration.

After time-frequency resources are allocated to the coordinately scheduled UE in the cell that sends the information of the time-frequency resources by the second scheduling module 1030 and the third scheduling module 1040, a signal is sent to the coordinately scheduled UE in the cell of the first scheduling device via the allocated time-frequency resources.

Moreover, if the second scheduling module 1030 and the third scheduling module 1040 determine the effective time of the allocated time-frequency resources, a signal may also be sent in the effective time to the coordinately scheduled UE in the cell that sends the information of the time-frequency resources via the allocated time-frequency resources.

If the information receiving module 1000 further receives a UE identifier, a signal is sent to the UE corresponding to the UE identifier by the second scheduling module 1030 and the third scheduling module 1040; if no UE identifier is received by the information receiving module 1000, the second scheduling module 1030 and the third scheduling module 1040 may obtain the UE identifier via the corresponding scheduling device.

In a specific implementing process, the second scheduling module 1030 and the third scheduling module 1040 may also determine the transmission rate level according to whether coordinated scheduling is successful and then determine the number of bits of the transmission blocks according to the determined rate level, and send a signal to the coordinately scheduled UE via the time-frequency resources allocated to the coordinately scheduled UE according to the number of bits of the transmission blocks determined.

There are various modes for determining the transmission rate level; for example, a corresponding relationship between the determination result and the coordinated scheduling may be preset (wherein, the corresponding relationship between the determination result and the coordinated scheduling is the same as the corresponding relationship between the determination result and the coordinated scheduling used by the first scheduling device), and then the transmission rate level is determined according to the corresponding relationship; or, the UE may be informed of the determination result, and then the UE returns the transmission rate level.

It should be noted that, this embodiment is not limited to the above two modes, and any mode in which the transmission rate level can be determined according to whether coordinated scheduling is successful is applicable for this embodiment.

The mode for determining the number of bits of the transmission blocks according to the determined rate level is decided according to the system in which the scheduling device lies, for example, the scheduling device lies in an LTE system, then the number of bits of the transmission blocks=the code rate corresponding to the transmission code rate level×the number of PRBs finally allocated×the number of symbols of each PRB.

All of the modules in FIG. 9 and FIG. 10 may lie in the same scheduling device, while the information sending module 920 is configured to send a coordinated scheduling request to another scheduling device, and the information receiving module 1000 is configured to receive a coordinated scheduling request from another scheduling device. That is, one scheduling device may send a coordinated scheduling request to another scheduling device and receive a coordinated scheduling request from another scheduling device. Thus, after resource scheduling is accomplished, the cell scheduled by the scheduling device will send a signal to the UE in the anchor cell, and send a signal to the coordinately scheduled UE in another cell when coordinated scheduling is agreed.

Figure 11:
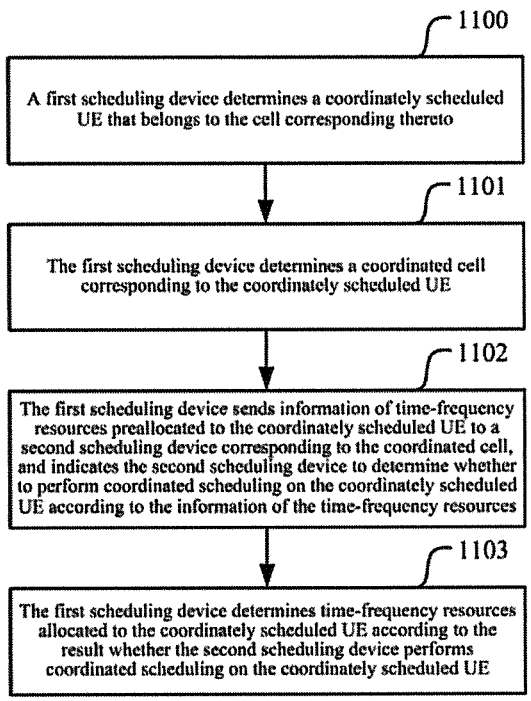
FIG. 11 is a schematic flow chart of a method for determining time-frequency resources in one embodiment of the invention.

As shown in FIG. 11, a method for determining time-frequency resources in one embodiment of the invention includes the following steps.

Step 1100: a first scheduling device determines a coordinately scheduled UE that belongs to the anchor cell corresponding to the first scheduling device.

The coordinately scheduled UE is a UE that can receive signals from the anchor cell and another coordinated cell, that is, the coordinately scheduled UE can at least receive the signals from at least two cells.

Step 1101: the first scheduling device determines a coordinated cell corresponding to the coordinately scheduled UE.

The mode for the first scheduling device to determine a coordinated cell corresponding to the coordinately scheduled UE includes, but not limited to, one of the following modes:

a coordinated cell corresponding to the coordinately scheduled UE is determined from the user information, a coordinated cell corresponding to the UE as reported by the UE itself.

Step 1102: the first scheduling device sends information of time-frequency resources preallocated to the coordinately scheduled UE to a second scheduling device corresponding to the coordinated cell, and indicates the second scheduling device to determine whether to perform coordinated scheduling on the coordinately scheduled UE according to the information of the time-frequency resources.

In a specific implementing process, the first scheduling device may send the information of the time-frequency resources preallocated to the coordinately scheduled UE via a coordinated scheduling request.

It should be noted that, if the coordinately scheduled UE corresponds to a plurality of coordinated cells, the first scheduling device sends a coordinated scheduling request to the second scheduling device of each coordinated cell corresponding to the coordinately scheduled UE.

Step 1103: the first scheduling device determines time-frequency resources allocated to the coordinately scheduled UE according to a result whether the second scheduling device performs coordinated scheduling on the coordinately scheduled UE.

In Step 1100, the first scheduling device obtains the information of the resources in the cell corresponding thereto and the information of the UE that needs to be scheduled in the cell (including coordinately scheduled UE and non-coordinately scheduled UE), respectively.

The resource information of the cell includes, but not limited to, one or more of the following information:

cell frequency, cell bandwidth, the overall available time-frequency resources in the cell and the maximum number of resources that can be used for coordinated scheduling (i.e., the resources for coordinated scheduling).

The UE information includes, but not limited to, one or more of the following information:

UE identifier, anchor cell identifier, UE QoS information, UE cached data amount and UE channel quality (where, for coordinated transmission, channel quality should include the quality of channels between a UE and a plurality of cells) information.

The first scheduling device may divide the UEs into non-coordinately scheduled UEs and coordinately scheduled UEs according to the information of the UEs of the anchor cell, such as channel quality. Where the non-coordinately scheduled UEs only occupy the resources of the anchor cell thereof. A method for distinguishing between the coordinately scheduled UEs and the non-coordinately scheduled UEs is as follows: the UEs in the cell center are non-coordinately scheduled UEs, and the UEs on the cell edge are coordinately scheduled UEs.

Of course, this embodiment is not limited to the above dividing mode, and all the other modes that can divide the non-coordinately scheduled UEs are applicable for this embodiment.

In Step 1102, when preallocating time-frequency resources to the coordinately scheduled UE, the first scheduling device may preallocate time-frequency resources to the coordinately scheduled UE according to the attributes such as the Buffer data information amount of the UE and the QoS of the UE (which is similar to the existing independent scheduling UE). Similarly, a non-coordinately scheduled UE may also be allocated time-frequency resources in such a mode. In one embodiment, some time-frequency resources may be preset in the cell, which are specially allocated to the coordinately scheduled UEs in the anchor cell; and the time-frequency resources preset by different cells are preferably different, for example, for three cells in an LTE system, the time-frequency resources configured by the first cell are resources with PRB identifiers of 1-15, the time-frequency resources configured by the second cell are resources with PRB identifiers of 16-30, and the time-frequency resources configured by the third cell are resources with PRB identifiers of 31-45.

Before the time-frequency resources are preallocated, the first scheduling device may further queue the priorities of the UEs in the anchor cell (including non-coordinately scheduled UEs and coordinately scheduled UEs) according to a certain principle, for example, according to PF algorithm; after queuing is accomplished, time-frequency resources are preallocated to the UEs in the queue according to the priority order. However, it may only perform priority queuing on the coordinately scheduled UEs in the anchor cell and then preallocate time-frequency resources to the coordinately scheduled UEs, and preallocate time-frequency resources to non-coordinately scheduled UEs after resources are preallocated to the coordinately scheduled UEs.

After time-frequency resource preallocation is accomplished, the first scheduling device sends the information of the time-frequency resources preallocated to the coordinately scheduled UE to the coordinated cell corresponding to the coordinately scheduled UE, and indicates the scheduling device in the coordinated cell to determine whether to perform coordinated scheduling on the coordinately scheduled UE according to the information of the time-frequency resources, that is, it requires the coordinated cell to schedule the coordinately scheduled UE by using the same time-frequency resources.

In a specific implementing process, the first scheduling device may send the information of the time-frequency resources preallocated to the coordinately scheduled UE via a coordinated scheduling request.

If the coordinately scheduled UE corresponds to a plurality of coordinated cells, the first scheduling device sends a coordinated scheduling request to each coordinated cell.

The coordinated scheduling request may further include one or more of UE identifier and the information needed by other physical layer processing.

The following step may further be included between Step 1102 and Step 1103:

Step a) the second scheduling device obtains a determination result after determining whether to perform coordinated scheduling on the coordinately scheduled UE according to the information of the time-frequency resources, and returns the determination result to the first scheduling device.

If the second scheduling device receives a coordinated scheduling request, the information of the time-frequency resources may be extracted from the coordinated scheduling request.

Correspondingly, the second scheduling device may send the determination result via a coordination request acknowledgement message.

In Step 1103, the first scheduling device may determine time-frequency resources allocated to the coordinately scheduled UE according to the determination result after receiving the determination result from another scheduling device.

If the second scheduling device receives the information of the time-frequency resources of a plurality of first scheduling devices, it needs to obtain the corresponding determination result according to each information of time-frequency resources and send each determination result to the corresponding first scheduling device.

In Step a), the second scheduling device may obtain the determination result in two modes:

Mode 1: the second scheduling device determines whether time-frequency resources corresponding to the information of the time-frequency resources in the anchor cell corresponding thereto are allocated; for example, if in an LTE system, the information of the time-frequency resources received are resources with PRB identifiers of 1-15, the second scheduling device examines whether resources with PRB identifiers of 1-15 in the anchor cell are allocated;

when the time-frequency resources are completely allocated, the determination result obtained is coordinated scheduling rejected;

when no time-frequency resources are allocated, the determination result obtained is coordinated scheduling agreed;

when the time-frequency resources are partially allocated, the determination result obtained is coordinated scheduling agreed or rejected.

If the determination result obtained is coordinated scheduling agreed when the time-frequency resources are partially allocated, it determines information of time-frequency resources that are not allocated; and the second scheduling device sends the determination result together with the information of the time-frequency resources that are not allocated.

Mode 2: The priorities of coordinated scheduling and non-coordinated scheduling are preset;

The second scheduling device determines whether the time-frequency resources corresponding to the information of the time-frequency resources in the anchor cell corresponding thereto are allocated;

when the time-frequency resources are completely allocated to a non-coordinately scheduled UE and the priority of coordinated scheduling is preset to be higher than the priority of non-coordinated scheduling, the time-frequency resources are reallocated to the coordinately scheduled UE (i.e., coordinated scheduling occupies the resources of non-coordinated scheduling), and a determination result of coordinated scheduling agreed is obtained.

It should be noted that, other situations of Mode 2 are similar to those of Mode 1, thus repeated description will be omitted here.

In one embodiment, a threshold may also be preset. Thus, before determining the determination result, the second scheduling device first determines whether the number of the time-frequency resources for coordinated scheduling is smaller than the threshold, if so, it continues to determine; otherwise, it directly determines that the determination result is coordinated scheduling rejected.

In a specific implementing process, the type and size of the threshold may be configured as required; for example, the threshold may be a percentage, then it examines whether the percentage of the number of time-frequency resources for coordinated scheduling in the number of resources in the whole cell is smaller than the threshold; the threshold may also be a specific numerical value, then it directly examines whether the number of the time-frequency resources for coordinated scheduling is smaller than the threshold.

Corresponding to the above determination results, Step 1103 includes three situations:

Situation 1: the determination result received is coordinated scheduling rejected.

The first scheduling device takes the time-frequency resources preallocated to the coordinated scheduling UE as the time-frequency resources allocated to the coordinately scheduled UE.

Situation 2: the determination result received is coordinated scheduling agreed.

The first scheduling device takes the time-frequency resources preallocated to the coordinated scheduling UE as the time-frequency resources allocated to the coordinately scheduled UE.

Situation 3: the determination result received is coordinated processing agreed, and information of the time-frequency resources is received together with determination result; at this point, the first scheduling device has two processing modes:

Processing Mode 1: The first scheduling device takes the time-frequency resources preallocated to the coordinated scheduling UE as the time-frequency resources allocated to the coordinately scheduled UE (in this mode, the time-frequency resources allocated to the coordinated scheduling UE by the anchor cell are different from those by the coordinated cell).

Processing Mode 2: The first scheduling device takes the time-frequency resources of the cell thereof corresponding to the received information of the time-frequency resources that are not allocated as the time-frequency resources allocated to the coordinately scheduled UE (in this mode, the time-frequency resources allocated to the coordinated scheduling UE by the anchor cell are the same as those by the coordinated cell).

If there exist a plurality of coordinated cells and a part of the corresponding time-frequency resources in a part of the coordinated cells can be allocated to the coordinately scheduled UE, each cell may schedule by using the time-frequency resources allocated to the coordinately scheduled UE by itself;

Negotiation may be performed between cells, and the same part of time-frequency resources in each cell are allocated to the coordinately scheduled UE; for example, for the three cells in an LTE system, the time-frequency resources of the anchor cell are resources with PRB identifiers of 1-15, and the time-frequency resources of the other two coordinated cells are resources with PRB identifiers of 1-10 and 5-15 respectively, then after negotiation, the three cells all use the resources with PRB identifiers of 5-10;

If each cell does not have the same part of time-frequency resources allocated to the coordinately scheduled UE, each cell may schedule by using the time-frequency resources allocated to the coordinately scheduled UE by itself.

It may further include the following step after Step 1103:

Step b): the first scheduling device sends a signal to the coordinately scheduled UE of the anchor cell via the allocated time-frequency resources.

It may further include the following step after Step a):

Step c): the second scheduling device sends a signal to the coordinately scheduled UE in the anchor cell of the first scheduling device via the allocated time-frequency resources.

In one embodiment, in Step a) and Step c), the first scheduling device and the second scheduling device may also respectively determine the transmission rate level according to whether coordinated scheduling is successful and then determined the number of bits of the transmission blocks according to the determined rate level, and send a signal to the coordinately scheduled UE via the time-frequency resources allocated to the coordinately scheduled UE according to the number of bits of the transmission blocks determined.

There are various modes for determining the transmission rate level; for example, a corresponding relationship between the determination result and the coordinated scheduling may be preset, and then the transmission rate level is determined according to the corresponding relationship; or, the UE may be informed of the determination result, and then the UE returns the transmission rate level.

It should be noted that, this embodiment is not limited to the above two modes, and any mode in which the transmission rate level can be determined according to whether coordinated scheduling is successful is applicable for this embodiment.

The mode for determining the number of bits of the transmission blocks according to the determined rate level is decided according to the system in which the scheduling device lies, for example, the scheduling device lies in an LTE system, then the number of bits of the transmission blocks=the code rate corresponding to the transmission code rate level×the number of PRBs finally allocated×the number of symbols of each PRB.

In a specific implementing process, the scheduling device in this embodiment may not receive the determination result from another scheduling device due to the factors such as the network. To solve this problem, a feedback time may also be set, and a timer is started after Step 1102, if no determination result is received in the set feedback time by the first scheduling device, it is determined that the second scheduling device rejects coordinated scheduling, and then in Step 1103, the corresponding processing is carried out according to the determination result is coordinated scheduling rejected.

If in Step a), the determination result obtained is coordinated scheduling agreed when no time-frequency resources are allocated, it may further include the following step after Step a):

Step S1: the second scheduling device allocates the time-frequency resources in the cell it lies in corresponding to the received information of the time-frequency resources to the coordinately scheduled UE in the cell of the first scheduling device.

If in Step a), the time-frequency resources are partially allocated and the determination result obtained is coordinated scheduling agreed, it may further include the following step after Step a):

Step S2: the second scheduling device allocates the time-frequency resources that are not allocated in the cell it lies in corresponding to the received information of the time-frequency resources to the coordinately scheduled UE in the cell of the first scheduling device.

If in Step a), the time-frequency resources are completely allocated to a non-coordinately scheduled UE and a determination result of coordinated scheduling agreed is obtained, it may further include the following step after Step a):

Step S3: the second scheduling device allocates the time-frequency resources in the cell it lies in corresponding to the received information of the time-frequency resources to the coordinately scheduled UE in the cell of the first scheduling device.

Because the communication interface may have a certain time delay, in Step 1102, it may also determine a resource time point; and in order to avoid the frequent sending of a coordinated scheduling request, it may also determine resource duration in Step 1102.

In Step 1102, the first scheduling device sends the resource time point and the resource duration together with the information of the time-frequency resources preallocated to the coordinately scheduled UE; for example, the resource time point, the resource duration and the information of the time-frequency resources preallocated to the coordinately scheduled UE may all be placed in a coordinated scheduling request for sending.

In Step 1103, the first scheduling device determines effective time of the allocated time-frequency resources according to the resource time point and the resource duration.

Moreover, in Step b), the first scheduling device sends a signal to the coordinately scheduled UE of the anchor cell via the allocated time-frequency resources in the effective time.

After the effective time of the time-frequency resources elapses, it returns to Step 1100.

Where, resource time point=the current time when a coordinated scheduling request is sent+delay time. The delay time and the resource duration are preset as required.

In a specific implementing process, the set feedback time is preferably smaller than the delay time.

For the non-coordinately scheduled UEs, a resource time point (resource time point=starting point of the next scheduling period+delay time) and resource duration may also be set; in one embodiment, the resource time point of the non-coordinately scheduled UE is smaller than the resource time point in the coordinately scheduled UE, and the resource duration of the non-coordinately scheduled UE is smaller than the resource duration of the coordinately scheduled UE.

Correspondingly, if in Step a), the second scheduling device further receives the resource time point and the resource duration in addition to the information of the time-frequency resources, the second scheduling device determines the effective time of the allocated time-frequency resources according to the resource time point and the resource duration in Step S1, Step S2 and Step S3.

Moreover, in Step c), the second scheduling device sends a signal to the coordinately scheduled UE in the cell of the first scheduling device via the allocated time-frequency resources in the effective time.

In a specific implementing process, if in Step a), the second scheduling device further receives a UE identifier, a signal may be sent to the UE corresponding to the UE identifier in Step S1, Step S2 and Step S3; if in Step a), no UE identifier is received by the second scheduling device, the second scheduling device may obtain the UE identifier via the corresponding first scheduling device.

Illustration will now be given according to one example.

Figure 12:
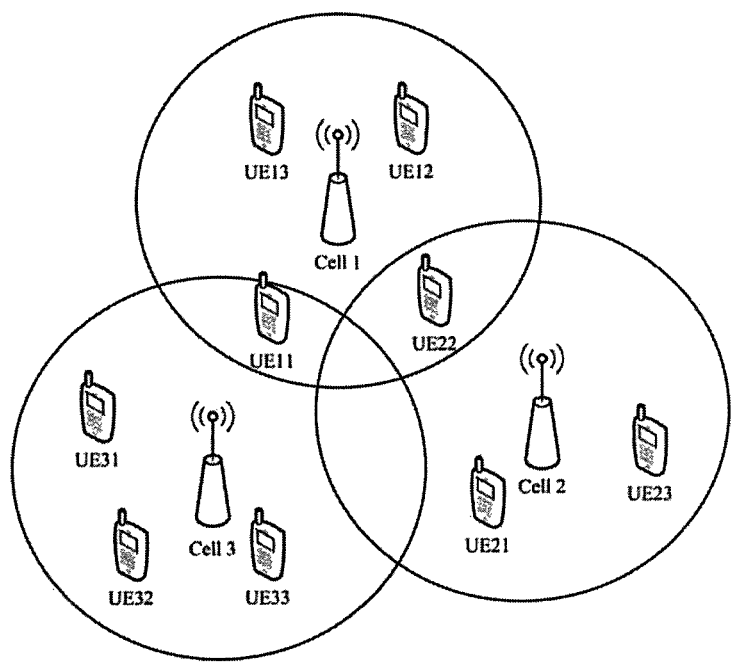
FIG. 12 is a schematic diagram of inter-UE negotiation in one embodiment of the invention.

As shown in FIG. 12, in a schematic diagram of inter-UE negotiation according to one embodiment of the invention, it is hypothesized that: an LTE-TDD system with a bandwidth of 10 MHz has three cells (i.e., cell 1, cell 2 and cell 3), 50 basic scheduling units are divided on the frequency, and each cell respectively defines 15 PRBs that are preferred for anchor cell coordinated scheduling, wherein cell 1 defines PRB1 with the identifiers of 1-15, cell 2 defines PRB2 with the identifiers of 16-30, and cell 3 defines PRB3 with the identifiers of 31-45.

The number of resources defined by each cell for neighboring cell coordinated transmission is at most 15 PRBs.

The specific steps include:

Step 00: each cell respectively judges the non-coordinately scheduled UEs and the coordinately scheduled UEs of the cell, and the corresponding results are as follows:

it is hypothesized that cell 1 has a UE set {UE11, UE12, UE13}, the scheduling weights of the corresponding UE priorities are {P11, P12, P13}, and the corresponding coordinated cells are {3, −1, −1};

it is hypothesized that cell 2 has a UE set {UE21, UE22, UE23}, the scheduling weights of the corresponding UE priorities are {P21, P22, P23}, and the corresponding coordinated cells are {−1, 1, −1};

it is hypothesized that cell 3 has a UE set {UE31, UE32, UE33}, the scheduling weights of the corresponding UE priorities are {P31, P32, P33}, and the corresponding coordinated cells are {−1, −1, −1}.

Step 01: the scheduling devices corresponding to cells 1-3 queue according to the priorities of the user weights in the cells 1-3, and then preallocate the time-frequency resources, and the preallocation results of the time-frequency resources are as follows:

cell 1: the user priority order of the cell 1 is {UE11, UE12, UE13};

cell 2: the user priority order of the cell 2 is {UE22, UE21, UE23};

cell 3: the user priority order of the cell 3 is {UE31, UE32, UE33};

cell 1: UE11 occupies a time-frequency resource PRB1 of the cell 1 with the identifiers of 1-15 and occupies PRB3 of a coordinated cell with the identifiers of 1-15; UE12 occupies PRB1 of the cell 1 with the identifiers of 16-40; and UE13 occupies PRB1 of the cell 1 with the identifiers of 41-50;

cell 2: UE22 occupies a resource PRB2 of the cell 2 with the identifiers of 16-30 and occupies PRB1 of a coordinated cell with the identifiers of 16-30; UE21 occupies PRB2 of the cell 2 with the identifiers of 1-15; and UE23 occupies a resource PRB2 of the cell 2 with the identifiers of 31-50;

cell 3: UE31 occupies PRB3 of the cell 3 with the identifiers of 1-30; and UE32 occupies PRB3 of the cell 3 with the identifiers of 31-50;

Where, for the non-coordinately scheduled UEs of the anchor cell, the resource duration of non-coordinated scheduling is 1 ms, and the resource time point of non-coordinated scheduling=starting point of the next scheduling period+1 ms; and for the coordinately scheduled UEs, the resource duration of coordinated scheduling is 5 ms, and the resource time point of coordinated scheduling=the current time when a coordinated scheduling request is sent+10 ms.

Step 02: cell 1 and cell 2 both have coordinately scheduled UEs, and the scheduling devices corresponding to the three cells all belong to different base stations, thus a coordinated transmission request is sent to a coordinated cell via the X2 interface between the base stations. That is, the scheduling device of cell 1 sends a coordinated scheduling request to the scheduling device of cell 3, and the scheduling device of cell 2 sends a coordinated scheduling request to the scheduling device of cell 1.

The content of the coordinated scheduling request includes: the information of the coordinately scheduled UE, PRB number of the resources the coordinated scheduling needs to occupy, the coordinated scheduling time point and the coordinated scheduling duration of the coordinated scheduling.

Step 03: after the scheduling devices corresponding to cell 1 and cell 3 receive the coordinated scheduling requests, each of them first judges whether the number of the time-frequency resources for coordinated scheduling is smaller than a threshold, if so, it continues to examine whether the time-frequency resources the coordinately scheduled UE needs to occupy have been allocated to other UEs in the cell, if not, the time-frequency resources may be allocated directly;

If the time-frequency resources the coordinately scheduled UE needs to occupy have been allocated to a non-coordinately scheduled UE in the cell, it examines the priorities of coordinated scheduling and non-coordinated scheduling; if the priority of coordinated scheduling is high, the time-frequency resources should be allocated to the coordinately scheduled UE in another cell (i.e., coordinated scheduling occupies the resources of non-coordinated scheduling);

If the time-frequency resources the coordinately scheduled UE needs to occupy have been allocated to a coordinately scheduled UE in another cell, or if the priority of coordinated scheduling is lower or the number of the time-frequency resources for coordinated scheduling is not smaller than the threshold, it is determined that coordination fails, and the cell that sends the coordinated scheduling request is informed of the result.

In this example, because the maximum number 15 is not exceeded and the time-frequency resources to be occupied by coordinated scheduling are not allocated, coordinated scheduling can be accomplished successfully in both cell 1 and cell 3.

Step 04: after it is determined that coordinated scheduling is successful, cell 1 and cell 3 determine that the time-frequency resources have been allocated to the coordinately scheduled UEs in neighboring cells during the corresponding time, and then send a coordination request acknowledge message to cell 3 and cell 2 respectively. The coordination request acknowledge message includes: IDs of the PRBs allocated (if all the time-frequency resources the scheduling UE in the neighboring cell needs to occupy have been allocated to the coordinately scheduled UE in the neighboring cell, the PRB IDs of the time-frequency resources allocated may not be sent; instead, it only needs to inform the corresponding neighboring cell that coordinated scheduling is successful).

Step 05: after receiving the coordination request acknowledge message, cell 1 and cell 2 respectively determine that coordinated scheduling is carried out successfully on users UE11 and UE22, and determine the time-frequency resources allocated to the coordinately scheduled UEs according to the result of successful coordinated scheduling, and get ready to send a signal in the mode scheduled by two cells.

If no coordination request acknowledge message is received after a feedback time, it is considered that the current coordination fails, and it determines the time-frequency resources allocated to the coordinately scheduled UE according to the result of failure coordination and gets ready to send a signal in the mode scheduled independently by the anchor cell only.

A certain margin is kept on the length of the feedback time, for example 9 ms, based on the delay time (10 ms in this embodiment), i.e., the feedback time is smaller than the delay time.

Step 06: after each time point is reached, a signal is sent to the coordinately scheduled UE of the anchor cell, the non-coordinately scheduled UE of the anchor cell and the coordinately scheduled UE of the neighboring cell after the negotiation is successful.

It should be noted that, the resources that have been allocated to coordinated users by the anchor cell or the resources of coordinately scheduled UEs that are to be determined need to be kept for coordinately scheduled UEs and cannot be occupied.

Step 07: after the resource duration of coordinated scheduling is reached, it returns to Step 01.

It can be seen from the above embodiments that: in the embodiments of the invention, a first scheduling device determines a coordinately scheduled UE that belongs to the anchor cell corresponding to the first scheduling device, where the coordinately scheduled UE is a UE that can receive signals from the anchor cell and another coordinated cell; the first scheduling device determines a coordinated cell corresponding to the coordinately scheduled UE; the first scheduling device sends information of time-frequency resources preallocated to the coordinately scheduled UE to a second scheduling device corresponding to the coordinated cell and indicates the second scheduling device to determine whether to perform coordinated scheduling on the coordinately scheduled UE according to the information of the time-frequency resources; and the first scheduling device determines time-frequency resources allocated to the coordinately scheduled UE according to a result whether the second scheduling device performs coordinated scheduling on the coordinately scheduled UE. Because the time-frequency resources can be determined after negotiating among a plurality of cells, the spectrum efficiency of the cell and the rate of the cell edge UEs can be improved.

The specific embodiments of a signal transmission method and a signal transceiving control apparatus, for addressing the problem in the prior art that the communication quality of the cell edge users is bad, will now be illustrated.

In the existing LTE system, a problem of bad communication quality will appear to users on the cell edge due to the interference of user communication signals from neighboring cells, and no effective solution to the problem is proposed in the prior art. In the embodiments of the invention, a signal transceiving control apparatus with a coordinated transmission capability determines a UE on which coordinated transmission needs to be performed, and it further determines the information of the signal transceiving control apparatuses that take part in the coordinated transmission corresponding to the UE on which coordinated transmission needs to be performed, and then it transmits data to the UE on which coordinated transmission needs to be performed jointly with other signal transceiving control apparatuses that take part in the coordinated transmission, thereby providing a feasible solution to the problem of bad communication quality of cell edge users.

In the existing LTE system, each base station or each logical cell functional entity in a base station independently schedules a UE in the coverage area of the base station, the main principle is as follows.

A UE measures a received signal, and reports the pilot signal strength, CQI, channel state information and so on of the anchor cell and the neighboring cells that are measured and the location of the UE to a base station or a logical cell functional entity in the base station that covers the anchor cell; the base station or the logical cell functional entity makes a scheduling decision according to the above received information and in conjunction with the QoS of the user and cell throughput maximization, etc., and indicates the UE to transmit a signal by using a specified transmitting frequency via an instruction corresponding to the scheduling decision.

Figure 13:
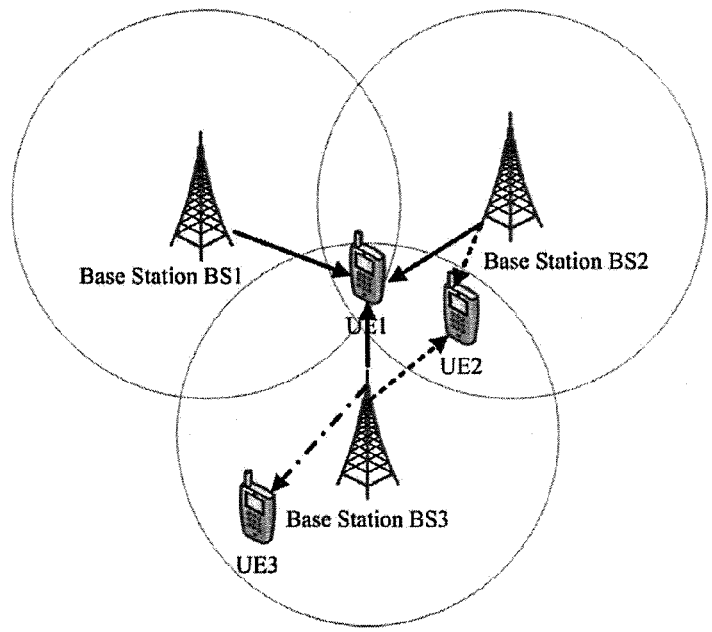
FIG. 13 is a schematic diagram of CoMP technology assumption in one embodiment of the invention.

To effectively improve the communication quality of the cell edge user, a CoMP technology assumption is proposed in an LTE-Advanced system. For the main principle of the technology, reference may be made to FIG. 13, where a plurality of signal transceiving control apparatuses that may work coordinately simultaneously send a signal to the same user at the same transmitting frequency; for example, base stations BS1, BS2, BS3 simultaneously transfer data to UE1 at a first transmitting frequency (as shown by the solid line arrow in FIG. 13), and base stations BS2, BS3 simultaneously transmit a signal to UE2 at a second transmitting frequency (as shown by the dotted line arrow in FIG. 13); each base station may also independently transmit a signal to a user, for example, base station BS3 independently transmits a signal to UE3 at a third transmitting frequency (as shown by the dash-dot line arrow in FIG. 13). A UE may simultaneously receive signals transmitted from a plurality of base stations and perform joint signal processing on the signals received, thus the communication quality of the cell edge user may be improved effectively.

To implement the above CoMP technology, the network entities that take part in the coordinated work, such as a signal transceiving control apparatus (for example, a base station or a logical cell functional entity in a base station, or a signal relay device) and a UE, need to learn the related information of the coordinated work, for example, the current working mode of each network entity, a signal transceiving control apparatus that may perform coordinated transmission, the transmitting frequency used for signal transmission. However, in the existing LTE system, each base station or logical cell functional entity or signal relay device independently schedules the available transmitting time-frequency resources for the UEs in the coverage area of the base station, and sends the above available transmitting time-frequency resources to a UE via a control channel or RRC signaling; a signal transceiving control apparatus cannot learn the above information needed for coordinated scheduling from another signal transceiving control apparatus, and no specific solution for a signal transceiving control apparatus to transmit data is given in the prior art.

The main realization principle of the technical solutions according to the embodiments of the invention, the specific embodiments and the corresponding beneficial effects that can be attained will now be illustrated in detail in conjunction with the drawings.

Figure 14:
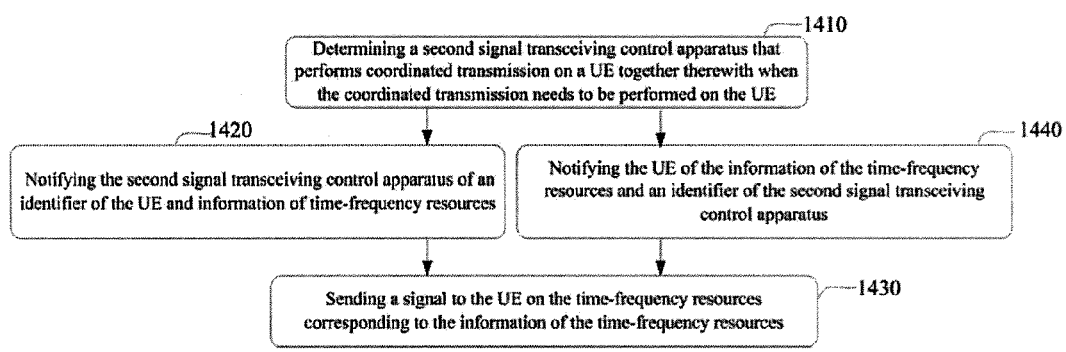
FIG. 14 is a flow chart of the main implementing principle in one embodiment of the invention.

As shown in FIG. 14, it shows a flow chart of the main realization principle of one embodiment of the invention.

Step 1410: a first signal transceiving control apparatus determines at least one second signal transceiving control apparatus that performs coordinated transmission on a UE together with the first signal transceiving control apparatus, when the first signal transceiving control apparatus that has established a communication connection with the UE determines that coordinated transmission needs to be performed on the UE;

Step 1420: the first signal transceiving control apparatus notifies the second signal transceiving control apparatus determined in Step 1410 of an identifier of the UE and information of time-frequency resources for sending a signal to the UE;

Step 1430: the first signal transceiving control apparatus sends a signal to the UE on the corresponding time-frequency resources according to the time-frequency resources in Step 1420, and the second signal transceiving control apparatus sends a signal to the UE corresponding to the UE identifier based on the corresponding time-frequency resources according to the information of the time-frequency resources and the identifier of the UE that are sent from the first signal transceiving control apparatus.

In one embodiment, Step 1440 may be further carried out based on the above steps: the first signal transceiving control apparatus notifies the UE of the information of the time-frequency resources and an identifier of the second signal transceiving control apparatus determined in Step 1410; the UE may receive signals sent by the first signal transceiving control apparatus and the signal transceiving control apparatus corresponding to the identifier of the signal transceiving control apparatus on the corresponding time-frequency resources according to the information of the time-frequency resources, thus the UE may receive the signals sent by a plurality of signal transceiving control apparatuses, and when the UE lies on the cell edge, a communication quality may be improved effectively.

The order for performing Step 1420 and Step 1440 may be: Step 1420 first, or Step 1440 first, or in parallel.

One embodiment will now be introduced in detail according to the above inventive principle of the invention, thereby describing and illustrating the main realization principle of the method according to the invention in detail.

In this embodiment, the signal transceiving control apparatus may be a base station, or a logical cell functional entity in a base station, or a signal relay device; it is one of the inherent attributes of a device whether a signal transceiving control apparatus has a coordinated transmission capability, and a neighboring signal transceiving control apparatus may learn whether a signal transceiving control apparatus has a coordinated transmission capability via an interface on the signal transceiving control apparatus (for example, the X2 interface). A signal transceiving control apparatus consists of one or more radio frequency transceiving units and one computing and controlling unit, where the radio frequency transceiving unit is configured to transmit data to a UE and receive data transmitted by the UE, and the computing and controlling unit is responsible for signaling configuration and scheduling strategy determination, etc.

Figure 15:
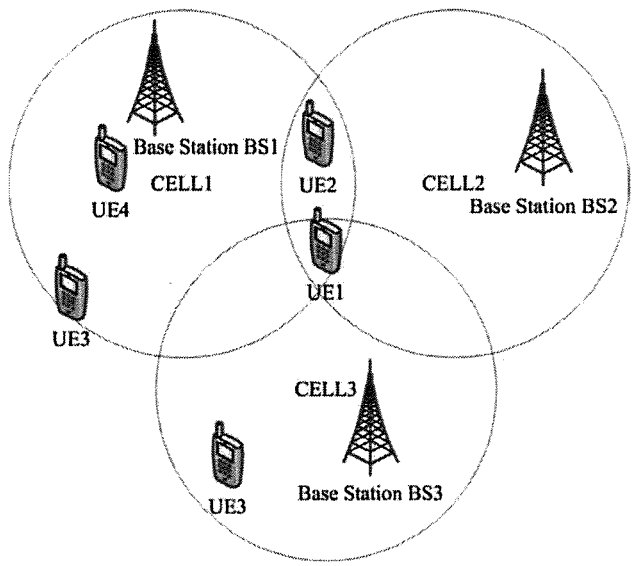
FIG. 15 is a schematic diagram of a communication network in one embodiment of the invention.

Referring to FIG. 15, it is a schematic diagram of a communication network in one embodiment of the invention, where CELL1, CELL2 and CELL3 are cells covered respectively by signal transceiving control apparatuses BS1, BS2 and BS3 that have a coordinated transmission capability, and UE1, UE2 and UE3 are UEs with a capability of receiving a coordinately transmitted signal, UE4 is a UE without the capability of receiving a coordinately transmitted signal; UE1, UE3 and UE4 have established a transmission connection with BS1, UE2 has established a transmission connection with BS2, and the signal transceiving control apparatus may learn whether a UE has a capability of receiving a coordinately transmitted signal according to the information reported by the UE.

Figure 16:
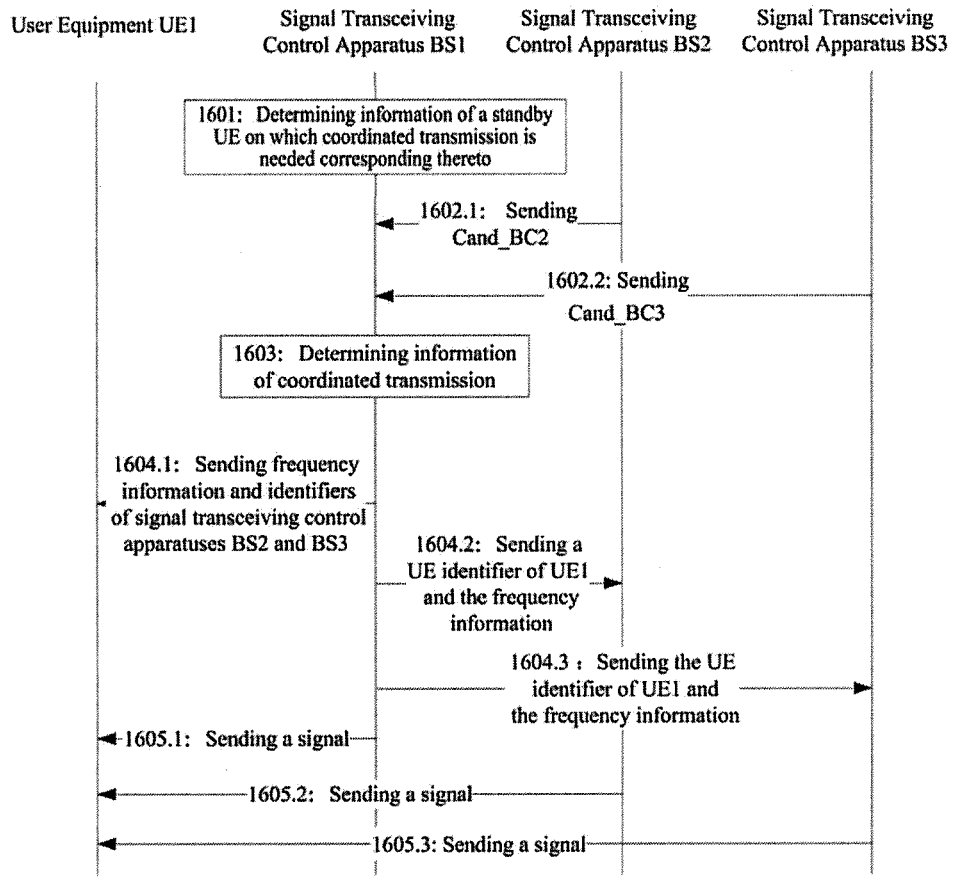
FIG. 16 is a schematic flow chart showing the specific implementing process of the technical solution proposed in one embodiment of the invention.

Referring to FIG. 16, it shows the specific process of coordinated transmission according to the technical solution proposed in one embodiment of the invention.

Step 1601: BS1 receives uplink sounding signals transmitted respectively by UE1, UE2, UE3, UE4 in the coverage area CELL1 thereof and measures the uplink sounding signals received; when the measurement result meets a preset condition, for example, when the power of the sounding signal in a neighboring cell corresponding to the UE is larger than a preset threshold, it is considered that the communication quality of the UE is bad, and the UE may be regarded as a standby UE on which coordinated transmission is needed. In this embodiment, the information of the standby UEs, corresponding to BS1, on which coordinated transmission is needed contains the information of UE1, UE2 and UE3, as represented by Cand_BC1={UE1, UE2, UE3}; in a similar way, the standby UE set on which coordinated transmission is needed in CELL2 contains the information of UE1 and UE2, as represented by Cand_BC2={UE1, UE2};

Step 1602: the information of the standby UEs obtained in Step 1601 on which coordinated transmission is needed is interacted between signal transceiving control apparatuses with a capability of coordinated transmission. For brief description, this embodiment will be introduced by taking the processing procedure in BS1 as an example, and the processing mode of BS2 is similar. BS1 receives Cand_BC2 sent by BS2 and Cand_BC3 sent by BS3, and sends Cand_BC1 to BS2 and BS3. Information of the above Cand_BC may be sent and received via an X2 interface between signal transceiving control apparatuses.

Step 1603: BS1 determines the information BC1 of the UEs, corresponding to BS1, on which coordinated transmission is needed, according to Cand_BC1 and Cand_BC2 sent by BS2 and Cand_BC3 sent by BS3 that are received, where the UE information of the UEs in BC1 needs to meet the following conditions:

the UE should be contained in both Cand_BC1, and Cand_BC2 or Cand_BC3, and a transmission connection has been established with BS1, and the UE has a capability of receiving a coordinately transmitted signal.

In this embodiment, the information BC1 of the UE, corresponding to BS1, on which coordinated transmission is needed includes the UE information of UE1, i.e., BC1={UE1};

Furthermore, for each UE in BC1, BS1 determines at least one standby signal transceiving control apparatus for coordinated transmission together therewith corresponding to the UE according to Cand_BC1, Cand_BC2 and Cand_BC3, that is, it determines the signal transceiving control apparatus Cand_UC1 that takes part in coordinated transmission corresponding to UE1, where the signal transceiving control apparatus in Cand_UC1 needs to meet the following conditions:

The information of UE1 lies in Cand_BCn sent by the second signal transceiving control apparatus BSn. In this embodiment, Cand_UC1={BS1, BS2, BS3}, and the signal transceiving control apparatus contained in Cand_UC1 is regarded as signal transceiving control apparatus UC1 that takes part in coordinated transmission on UE1;

Step 1604: for UE1, BS1 notifies BS2 and BS3 of the information such as the UE identifier of UE1, the information of the time-frequency resources used for signal transmission to UE1 determined by itself and the information of the physical layer parameter that may be used for the subsequent coordinated transmission, for example, precoding mode, transmission block size and transmitting power, according to UC1={BS1, BS2, BS3}, and indicates BS2 and BS3 to send a signal to UE1 together therewith based on the information of the time-frequency resources; simultaneously, it sends an instruction to UE1 for updating the transmission mode of UE1 to coordinated transmission mode, and notifies UE1 of the information of the time-frequency resources and the identifiers of signal transceiving control apparatuses BS2 and BS3 that take part in the coordinated transmission; the UE may receive signals sent by BS1 and the signal transceiving control apparatus corresponding to the identifiers of the signal transceiving control apparatuses on the corresponding frequencies respectively.

Step 1605: BS1, BS2, and BS3 jointly send signals to UE1 based on the above information such as the information of the time-frequency resources, and UE1 performs joint processing on the received signals sent by BS1, BS2 and BS3, so that the signal quality may be improved effectively, and the interference among BS1, BS2 and BS3 may be eliminated.

If communication switching occurs after Step 1605, the signal transceiving control apparatus that establishes a connection with UE1 after switching may keep the existing coordinated transmission status; or, it may be first switched into the default transmission mode, and then repeat the above processing procedure of BS1 and perform coordinated transmission.

By employing the above solution, the object that a plurality of signal transceiving control apparatuses jointly send signals to a UE on which coordinated transmission is needed can be attained, thus the communication quality of the UE may be improved.

In Step 1603, usually a plurality of signal transceiving control apparatuses jointly send signals to the UE, i.e., Cand_UC1 contains a plurality of signal transceiving control apparatuses; but in fact, it may guarantee that the communication quality of the UE meets the requirements when only a part of the signal transceiving control apparatuses take part in coordinated transmission, so that the electric energy and the channel resources needed by the signal transceiving control apparatus can be saved. Thus, Step 1603 may be modified as:

after obtaining Cand_UE1={BS1, BS2, B53}, BS1 sends signaling for specifying the information obtaining mode to the UE. In this embodiment, the information obtaining mode includes the following three types:

1) incorporating the reference signals sent by at least two signal transceiving control apparatuses, and obtaining the CQI information based on the incorporated signal; or 2) for each signal transceiving control apparatus, obtaining the CQI information of the signal transceiving control apparatus based on the reference signal sent by the signal transceiving control apparatus independently; or 3) for each signal transceiving control apparatus, determining the CQI information of the signal transceiving control apparatus based on the reference signal sent by the signal transceiving control apparatus independently and taking the CQI information that meets a preset condition as the CQI information obtained; for example, CQI information of signal transceiving control apparatuses with measured signal-tonoise ratio no lower than signal-to-noise ratio of a signal of BS1 by 3 db may be taken as obtained CQI information.

Furthermore, the UE may also be specified to return other information, for example, channel state information.

Then, according to the information returned by the UE and a preset rule, BS1 selects a part of the standby signal transceiving control apparatuses from the standby signal transceiving control apparatus set Cand_UC1={BS1, BS2, BS3} as the signal transceiving control apparatuses that perform coordinated transmission on the UE together therewith, where the preset rule may be the UE throughput maximization principle, that is, it determines the throughput of the UE after each signal transceiving control apparatus in the standby signal transceiving control apparatus set Cand_UC1 respectively takes part in coordinated transmission based on the CQI information fed back by the UE, and determines the signal transceiving control apparatus with the maximum UE throughput after taking part in coordinated transmission as the signal transceiving control apparatus selected. For example, in this embodiment, it may be known according to the CQI returned by UE1 that, the throughput of the UE after BS2 takes part in coordinated transmission is larger than the throughput of the UE after BS3 takes part in coordinated transmission, thus BS1 selects BS2 as the signal transceiving control apparatus that performs coordinated transmission on the UE together therewith, i.e., UC1={BS1, BS2}

In the embodiment of the invention, a signal transceiving control apparatus with coordinated transmission capability determines the UE on which coordinated transmission needs to be performed, and it further determines the information of the signal transceiving control apparatuses that take part in the coordinated transmission corresponding to the UE on which coordinated transmission needs to be performed, and notifies the signal transceiving control apparatuses determined that take part in the coordinated transmission of the identifier of the UE and the information of the time-frequency resources for sending a signal to the UE, and indicates the signal transceiving control apparatuses that take part in the coordinated transmission to jointly send signals to the UE corresponding to the identifier of the UE based on the information of the time-frequency resources; and it notifies the UE of the information of the time-frequency resources and the identifiers of the signal transceiving control apparatuses that take part in the coordinated transmission, and indicates the UE to receive, on the corresponding frequencies, signals sent by itself and the signal transceiving control apparatuses that take part in the coordinated transmission. With the above technical solution, it may be realized that a plurality of signal transceiving control apparatuses jointly send signals to a UE on which coordinated transmission is needed, so that the requirements of CoMP technology can be met, and a solution for effectively addressing the problem of bad communication quality of cell edge users can be provided.

Figure 17:
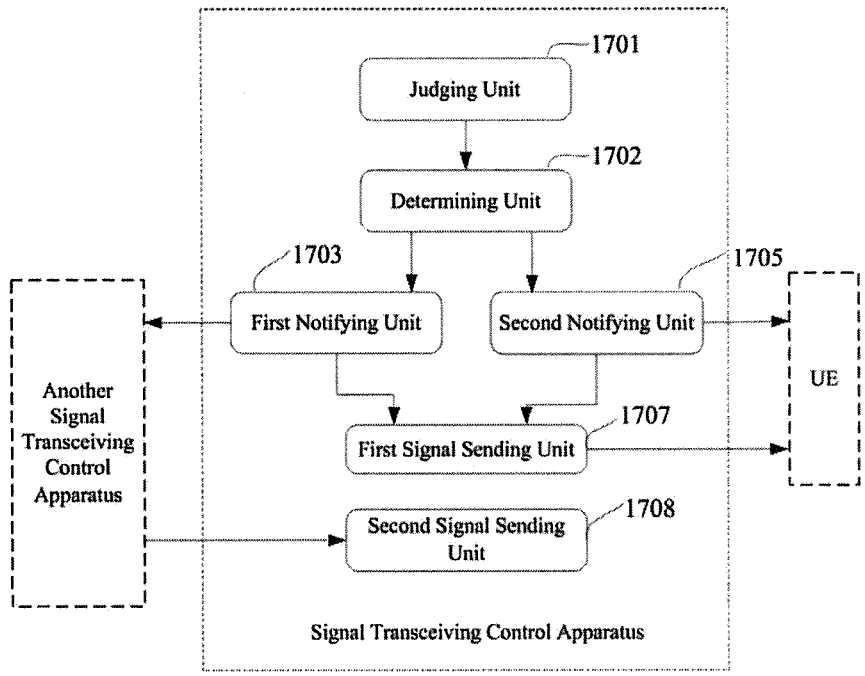
FIG. 17 is a structural representation of a signal transceiving control apparatus in one embodiment of the invention.

Correspondingly, one embodiment of the invention further provides a signal transceiving control apparatus. Referring to FIG. 17, the apparatus includes a judging unit 1701, a determining unit 1702, a first notifying unit 1703, a first signal sending unit 1707 and a second signal sending unit 1708.

The judging unit 1701 is configured to judge whether coordinated transmission needs to be performed on a UE.

The determining unit 1702 is configured to determine at least one signal transceiving control apparatus that performs coordinated transmission on the UE together with the signal transceiving control apparatus in which the determining unit lies when the judging unit 1701 judges that coordinated transmission needs to be performed on the UE.

The first notifying unit 1703 is configured to notify the signal transceiving control apparatus determined by the determining unit 1702 of an identifier of the UE and information of time-frequency resources for sending a signal to the UE.

The first signal sending unit 1707 is configured to send a signal to the UE on the corresponding time-frequency resources according to the information of the time-frequency resources indicated by the first notifying unit 1703.

The second signal sending unit 1708 is configured to send a signal to a UE corresponding to a UE identifier based on corresponding time-frequency resources according to an indication sent from another signal transceiving control apparatus and information of the time-frequency resources and an identifier of the UE corresponding to the indication.

In one embodiment, the above signal transceiving control apparatus may further include a second notifying unit 1705, which is configured to notify the UE of the information of the time-frequency resources and an identifier of the signal transceiving control apparatus determined by the determining unit 1702, so that the user equipment may receive, on the corresponding frequencies, signals sent by the signal transceiving control apparatus in which the second notifying unit 1705 lies and the signal transceiving control apparatus corresponding to the identifier of the signal transceiving control apparatus notified by the second notifying unit 1705 according to the information of the time-frequency resources notified by the second notifying unit 1705.

Figure 18:
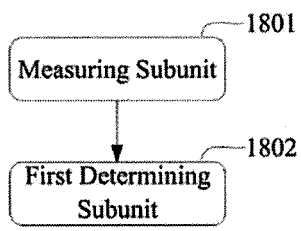
FIG. 18 is a structural representation of a judging unit in one embodiment of the invention.

In one embodiment, referring to FIG. 18, the above judging unit includes a measuring subunit 1801 and a first determining subunit 1802.

The measuring subunit 1801 is configured to measure a signal sent from the UE.

The first determining subunit 1802 is configured to determine that coordinated transmission needs to be performed on the UE, when the measurement result of the measuring subunit 1801 meets a preset condition and the first determining subunit is learned from at least another one signal transceiving control apparatus that the UE lies in a coverage area of said at least another one signal transceiving control apparatus, and when a measurement result obtained by said at least another one signal transceiving control apparatus via measuring a signal sent from the UE meets the preset condition.

The first realization solution for the above determining unit is that, the determining unit determines said at least another one signal transceiving control apparatus as the signal transceiving control apparatus that performs coordinated transmission on the UE together with the signal transceiving control apparatus in which the determining unit lies.

Figure 19:
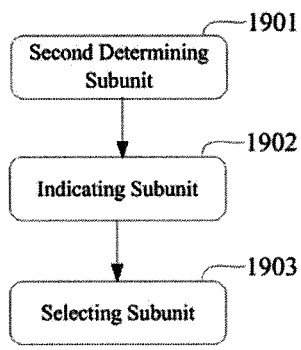
FIG. 19 is a structural representation of a second implementing solution of a determining unit in one embodiment of the invention.

Referring to FIG. 19, the second realization solution for the above determining unit is that, the determining unit specifically includes a second determining subunit 1901, an indicating subunit 1902 and a selecting subunit 1903.

The second determining subunit 1901 is configured to determine said at least another one signal transceiving control apparatus as a set of standby signal transceiving control apparatuses that performs coordinated transmission on the UE together with the signal transceiving control apparatus in which the second determining subunit lies.

The indicating subunit 1902 is configured to specify an information obtaining mode for the UE.

The selecting subunit 1903 is configured to select a signal transceiving control apparatus from the set of standby signal transceiving control apparatuses determined by the second determining subunit 1901 as the signal transceiving control apparatus that performs coordinated transmission on the UE together with the signal transceiving control apparatus in which the selecting subunit lies, based on information fed back by the UE and obtained according to the information obtaining mode specified by the indicating subunit 1902.

A device with the functions of the above signal transceiving control apparatus may be a base station or a logical cell functional entity in a base station, or a signal relay device, and it may also be a third-party device independent from the base station, the logical cell functional entity in the base station or the signal relay device.

It should be noted that, the above embodiments are only used to illustrate the invention, rather than limiting the scope of the invention, and the invention is not limited to the above embodiments, various technical solutions and modifications thereof without departing from the spirit and scope of the invention are all intended to be contemplated by the invention.

The invention claimed is:

1. A method for determining time-frequency resources, comprising:
   determining, by a first scheduling device, a coordinately scheduled user equipment, UE, that belongs to a anchor cell corresponding to the first scheduling device, wherein the coordinately scheduled UE is a UE that can receive signals from the anchor cell and another coordinated cell;
   determining, by the first scheduling device, the coordinated cell corresponding to the coordinately scheduled UE;
   sending, by the first scheduling device, information of time-frequency resources preallocated to the coordinately scheduled UE to a second scheduling device corresponding to the coordinated cell, and indicating the second scheduling device to determine whether to perform coordinated scheduling on the coordinately scheduled UE according to the information of the time-frequency resources; and
   determining, by the first scheduling device, time-frequency resources allocated to the coordinately scheduled UE, according to the result whether the second scheduling device performs coordinated scheduling on the coordinately scheduled UE.

2. The method of claim 1, further comprising:
   obtaining a determination result and returning the determination result to the first scheduling device, after the second scheduling device determines whether to perform coordinated scheduling on the coordinately scheduled UE according to the information of the time-frequency resources.

3. The method of claim 2, wherein, obtaining the determination result by the second scheduling device comprises:
   determining, by the second scheduling device, whether time-frequency resources in a cell corresponding to the second scheduling device corresponding to the information of the time-frequency resources received are allocated;
   obtaining, by the second scheduling device, a determination result of coordinated scheduling rejected, when the time-frequency resources are completely allocated;
   obtaining, by the second scheduling device, a determination result of coordinated scheduling agreed, when the time-frequency resources are not allocated; and
   obtaining, by the second scheduling device, a determination result of coordinated scheduling agreed or rejected, when the time-frequency resources are partially allocated.

4. The method of claim 3, wherein, when the time-frequency resources are partially allocated and the determination result obtained is coordinated scheduling agreed, the second scheduling device returns the determination result and information of time-frequency resources that are not allocated to the first scheduling device;
   determining time-frequency resources allocated to the coordinately scheduled UE by the first scheduling device comprises:
   allocating, by the first scheduling device, time-frequency resources of the cell corresponding to the first scheduling device corresponding to the received information of the time-frequency resources that are not allocated to the coordinately scheduled UE.

5. The method of claim 2, wherein obtaining the determination result by the second scheduling device comprises:
   obtaining, by the second scheduling device, a determination result of coordinated scheduling agreed, when the time-frequency resources are completely allocated to a non-coordinately scheduled UE and a priority of coordinated scheduling is preset to be higher than a priority of non-coordinated scheduling.

6. The method of claim 3, further comprising the following step after the second scheduling device receives the information of the time-frequency resources from the first scheduling device and before it obtains the determination result:
   determining, by the second scheduling device, that in the cell corresponding to the second scheduling device, the number of the time-frequency resources for coordinated scheduling is smaller than a preset threshold.

7. The method of claim 3, further comprising:
   allocating, by the second scheduling device, time-frequency resources in the cell corresponding to the second scheduling device corresponding to the information of the time-frequency resources received to the coordinately scheduled UE, when the time-frequency resources are not allocated and the determination result obtained is coordinated scheduling agreed; and
   allocating, by the second scheduling device, time-frequency resources that are not allocated in the cell corresponding to the second scheduling device corresponding to the information of the time-frequency resources received to the coordinately scheduled UE, when the time-frequency resources are partially allocated and the determination result obtained is coordinated scheduling agreed.

8. The method of claim 5, further comprising:
   allocating, by the second scheduling device, time-frequency resources in the cell corresponding to the second scheduling device corresponding to the information of the time-frequency resources received to the coordinately scheduled UE.

9. The method of claim 7, wherein, sending the information of the time-frequency resources by the first scheduling device to the second scheduling device corresponding to the coordinated cell comprises:
   sending, by the first scheduling device, a resource time point, resource duration and the information of the time-frequency resources preallocated to the coordinately scheduled UE to the second scheduling device corresponding to the coordinated cell;
   the method further comprises the following step after allocating by the second scheduling device the time-frequency resources of the cell corresponding to the second scheduling device to the coordinately scheduled UE:
   determining, by the second scheduling device, effective time of the time-frequency resources allocated according to the resource time point and the resource duration;

the method further comprises the following step after determining by the first scheduling device the time-frequency resources allocated to the coordinately scheduled UE:
  determining, by the first scheduling device, effective time of the time-frequency resources allocated according to the resource time point and the resource duration.

10. The method of claim 2, further comprising the following step after sending by the first scheduling device the information of the time-frequency resources preallocated to the coordinately scheduled UE to the second scheduling device corresponding to the coordinated cell and before determining by the first scheduling device the time-frequency resources allocated to the coordinately scheduled UE:
  determining, by the first scheduling device, that the second scheduling device rejects coordinated scheduling, when no determination result is received in a set feedback time.

11. A scheduling device, comprising a memory and a processor, wherein the memory stores program code, and wherein the program code is executable by the processor to implement:
  a UE determination module, configured to determine a coordinately scheduled UE that belongs to a anchor cell corresponding to the scheduling device, wherein the coordinately scheduled UE is a UE that can receive signals from the anchor cell and another coordinated cell;
  a cell determination module, configured to determine the coordinated cell corresponding to the coordinately scheduled UE;
  an information sending module, configured to send information of time-frequency resources preallocated to the coordinately scheduled UE; and
  a first scheduling processing module, configured to determine time-frequency resources allocated to the coordinately scheduled UE according to a result whether a scheduling device corresponding to the coordinated cell performs coordinated scheduling on the coordinately scheduled UE.

12. The scheduling device of claim 11, wherein the first scheduling processing module is configured to:
  allocate time-frequency resources of the cell corresponding to the scheduling device corresponding to the received information of the time-frequency resources that are not allocated to the coordinately scheduled UE, after receiving the determination result and the information of the time-frequency resources that are not allocated.

13. The scheduling device of claim 11, wherein the information sending module is configured to:
  send a resource time point, resource duration and information of the time-frequency resources preallocated to the coordinately scheduled UE to the scheduling device corresponding to the coordinated cell.

14. The scheduling device of claim 11, wherein the program code stored in the memory is further executable by the processor to implement:
  a timing module, configured to determine that the scheduling device corresponding to the coordinated cell rejects coordinated scheduling if no determination result is received in a set feedback time, after the information sending module sends the information of the time-frequency resources and before the first scheduling processing, module determines the time-frequency resources allocated to the coordinately scheduled UE.

15. A scheduling device, comprising a memory and a processor, wherein the memory stores program code, and wherein the program code is executable by the processor to implement:
  an information receiving module, configured to receive information of the time-frequency resources; and
  a determining module, configured to determine whether to perform coordinated scheduling on a coordinately scheduled UE according to the received information of the time-frequency resources.

16. The scheduling device of claim 15, wherein, the determining module is configured to:
  obtain a determination result after determining whether to perform coordinated scheduling on the coordinately scheduled UE according to the information of the time-frequency resources;
  the scheduling device comprises:
  a determination sending module, configured to return the determination result.

17. The scheduling device of claim 15, wherein, the determining module is configured to:
  determine whether time-frequency resources in the cell corresponding to the scheduling device corresponding to the received information of the time-frequency resources are allocated;
  obtain a determination result of coordinated scheduling rejected when the time-frequency resources are completely allocated;
  obtain a determination result of coordinated scheduling agreed when the time-frequency resources are not allocated; and
  obtain a determination result of coordinated scheduling agreed or rejected when the time-frequency resources are partially allocated.

18. The scheduling device of claim 17, wherein, the determining module is configured to:
  return the determination result and the information of the time-frequency resources that are not allocated when the time-frequency resources are partially allocated and the determination result obtained is coordinated scheduling agreed;
  the determination sending module is configured to:
  return the determination result and the information of the time-frequency resources that are not allocated.

19. The scheduling device of claim 15, wherein, the determining module is configured to:
  obtain a determination result of coordinated scheduling agreed when the time-frequency resources are completely allocated to a non-coordinately scheduled UE and a priority of coordinated scheduling is preset to be higher than a priority of non-coordinated scheduling.

20. The scheduling device of claim 17, wherein the program code stored in the memory is further executable by the processor to implement:
  a second scheduling module, configured to allocate time-frequency resources in the cell corresponding to the scheduling device corresponding to the received information of the time-frequency resources to the coordinately scheduled UE when the time-frequency resources are not allocated and the determination result obtained is coordinated scheduling agreed; and
  allocate time-frequency resources that are not allocated in the cell corresponding to the scheduling device corresponding to the received information of the time-frequency resources to the coordinately scheduled UE when the time-frequency resources are partially allocated and the determination result obtained is coordinated scheduling agreed.

21. The scheduling device of claim 20, wherein, the second scheduling module is further configured to determine effective time of the allocated time-frequency resources according to a received resource time point and resource duration.

* * * * *